(12) United States Patent
Strassenburg-Kleciak

(10) Patent No.: US 7,689,032 B2
(45) Date of Patent: Mar. 30, 2010

(54) SCANNING SYSTEM FOR THREE-DIMENSIONAL OBJECTS

(75) Inventor: Marek Strassenburg-Kleciak, Hamburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1121 days.

(21) Appl. No.: 11/284,803

(22) Filed: Nov. 21, 2005

(65) Prior Publication Data

US 2006/0188143 A1    Aug. 24, 2006

Related U.S. Application Data

(63) Continuation-in-part of application No. 10/519,252, filed as application No. PCT/US03/20225 on Jun. 30, 2003.

(60) Provisional application No. 60/395,165, filed on Jul. 10, 2002.

(30) Foreign Application Priority Data

Nov. 19, 2004    (EP)    ................... 04027566

(51) Int. Cl.
*G06K 9/00*    (2006.01)
*G06K 9/36*    (2006.01)
(52) U.S. Cl. ...................... 382/154; 382/284
(58) Field of Classification Search ................. 382/154, 382/284
See application file for complete search history.

(56) References Cited

U.S. PATENT DOCUMENTS

| 5,194,969 | A | 3/1993 | DiFrancesco |
|---|---|---|---|
| 5,471,572 | A | 11/1995 | Buchner et al. |
| 5,566,073 | A | 10/1996 | Margolin |
| 5,802,361 | A | 9/1998 | Wang et al. |
| 5,988,862 | A | 11/1999 | Kacyra et al. |
| 6,169,516 | B1 | 1/2001 | Watanabe et al. |
| 6,246,468 | B1 | 6/2001 | Dimsdale |
| 6,285,373 | B1 | 9/2001 | Baldwin et al. |
| 6,522,336 | B1 | 2/2003 | Burrell |
| 6,600,553 | B1 | 7/2003 | Stone |
| 7,218,318 | B2 | 5/2007 | Shimazu ..................... 345/419 |
| 2001/0048443 | A1 | 12/2001 | Yuasa |

(Continued)

FOREIGN PATENT DOCUMENTS

DE    199 48 544 A1    10/2001

(Continued)

OTHER PUBLICATIONS

International Application No. PCT/US03/20225, filed Jun. 30, 2003, International Search Report.

(Continued)

*Primary Examiner*—John B Strege
(74) *Attorney, Agent, or Firm*—Brinks Hofer Gilson & Lione

(57) ABSTRACT

A scanning system scans a surface of a three-dimensional object from a first position and a second position. Using common alignment at these positions, a first scanning sample and a second scanning sample are generated. The first and second scanning samples include point clouds having data points representing positions of the scanned surfaces. The first scanning sample and the second scanning sample are oriented relative to each other based on the common alignment of the scan positions.

30 Claims, 23 Drawing Sheets

U.S. PATENT DOCUMENTS

| | | |
|---|---|---|
| 2001/0056308 A1 | 12/2001 | Petrov et al. |
| 2002/0044086 A1* | 4/2002 | Boman .................. 342/357.08 |
| 2003/0021343 A1 | 1/2003 | Trovato |
| 2006/0087505 A1 | 4/2006 | Dumesny et al. |
| 2006/0110026 A1 | 5/2006 | Strassenburg-Kleciak ... 382/154 |
| 2006/0152522 A1 | 7/2006 | Strassenburg-Kleciak ... 345/582 |

FOREIGN PATENT DOCUMENTS

| | | |
|---|---|---|
| JP | 03-078095 | 4/1991 |
| JP | 08-159762 | 6/1996 |
| JP | 09-102029 | 4/1997 |
| JP | 10-091760 | 4/1998 |
| JP | 10-207351 | 8/1998 |
| JP | 10275246 | 10/1998 |
| JP | 11-120374 | 4/1999 |
| JP | 11-175759 | 7/1999 |
| JP | 2000-020735 | 1/2000 |
| JP | 2000-509150 | 7/2000 |
| JP | 2000-331019 | 11/2000 |
| JP | 2001-043394 | 2/2001 |
| JP | 2001-325619 | 11/2001 |
| WO | WO 97/40342 | 10/1997 |
| WO | WO 01/31290 A2 | 3/2001 |
| WO | WO 2004/006181 A2 | 1/2004 |

OTHER PUBLICATIONS

*Study on Making City Model With Image and Laser Range Data*, Masafumi Nakagawa and Ryosuke Shibasaki, $22^{nd}$ Asian Conference on Remote Sensing, Nov. 5-9, 2001.

The prosecution history of U.S. Appl. No. 10/519,223 shown in the attached patent application retrieval file wrapper document list, printed Apr. 6, 2009, including each substantive office action and applicant response.

The prosecution history of U.S. Appl. No. 10/519,252 shown in the attached patent application retrieval file wrapper document list, printed Apr. 6, 2009, including each substantive office action and applicant response.

Adobe Photoshop Incorporated, "Adobe Photshop 5.0 User Guide," XP002522158, pp. 347-358, Dec. 31, 1998.

Elliot, Steven, et al., "Inside 3D Studio Max 2.5 Top," Japan, Softbank Co., Ltd., Oct. 6, 1998, $1^{st}$ Edition, p. 491-494.

European Office Action dated Jun. 9, 2009, issued in European Application No. 04 027 566.1 (6 pgs).

* cited by examiner

SCANNING SYSTEM FOR THREE-DIMENSIONAL OBJECTS

PRIORITY CLAIM

This application claims the benefit of priority from European Patent Application No. 04027566.1, filed Nov. 19, 2004, which is incorporated by reference. This application is a continuation-in-part of the U.S. application Ser. No. 10/519,252 filed Nov. 21, 2005, which is the U.S. nationalization of International Application No. PCT/US2003/020225 filed on Jun. 30, 2003. The International Application No. PCT/US2003/020225 claims the benefit of the filing date of U.S. Provisional Application No. 60/395,165 filed on Jul. 10, 2002. In addition, the following commonly owned patent application is related to this application: U.S. patent application Ser. No. 10/519,223, filed Nov. 21, 2005, entitled SYSTEM FOR TEXTURIZING ELECTRONIC REPRESENTATIONS OF OBJECTS. The disclosures of all of the above applications are incorporated herein by reference.

BACKGROUND OF THE INVENTION

1. Technical Field

The invention relates to a system for scanning three-dimensional objects and more particularly, to a scanning system for three-dimensional objects using an aligned orientation for multiple scans.

2. Related Art

Navigational maps may be displayed in an electronic form. Some navigational maps are electronically displayed in two-dimensions. As such, a user of a navigational map may have difficulty in orienting himself to a location on the display. Navigational maps displaying objects in three dimensions may overcome these drawbacks by displaying objects as a user would observe them in the surrounding environment.

Three-dimensional electronic representations of an object may be created using a digital camera. Another technique uses artists that manually create three-dimensional views of objects. Still another technique uses lasers. In some laser techniques, a laser beam is reflected off an object to measure distances. The distances may be used to map the shape of an object and create an electronic representation. Some laser techniques measure distance from reference points, such as metal targets that must be installed on the object. The targets may be included in multiple scans of the object. The multiple scans are then manually combined into a three-dimensional representation using the targets. Known laser techniques generate only geometric shapes of objects.

In electronic navigational maps, accurate electronic representations of large multi-structural objects, such as office complexes or shopping malls may provide a navigational bearing. Visual details and other features of large objects may be needed to accurately compare a displayed object to an observed surrounding. Unfortunately, electronic representations formed with digital cameras may require manual combinations of multiple electronic images. The combined images may not provide sufficient visual details and features. Electronic representations created by artists may be inaccurate, time-consuming, costly, and may add undesirable data to navigational maps. When laser techniques are used the reference points on large objects may be difficult to install and/or maintain while scanning the object. In addition it is difficult to accurately and efficiently create an electronic model of a large object or convert multiple scans into a three-dimensional representation of the object. Therefore, there is a need for a scanning method that may simplify scan data processing and provide improved accuracy.

SUMMARY

A scanning system of a three-dimensional object scans a surface from a first and a second scanning position. The first and second scanning positions may be aligned to a particular orientation through multiple scans. A first scanning sample and a second scanning sample may be generated from these scans at different scanning positions. Coordinates of the scanning samples may be determined with a satellite based positioning system that may be compensated through a predetermined error or correction signals. The first and second scanning samples may be registered through the first and seconds scanning positions. In these positions, the samples may be oriented with each other using an orientation of different scanned parts of the surface. For a horizontal alignment of the first and second scanning positions, registration may be performed with appropriate rotations of the first and second scanning samples.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

An image generation system develops texturized three-dimensional electronic models of objects. The electronic models may be used in many applications, including navigational maps. The terms "electronic representation", "electronic form", "electronic model" and "electronic image" should be broadly construed to include any form of digital data that may be captured, manipulated, stored and displayed visually such as, a data file.

Figure 1:
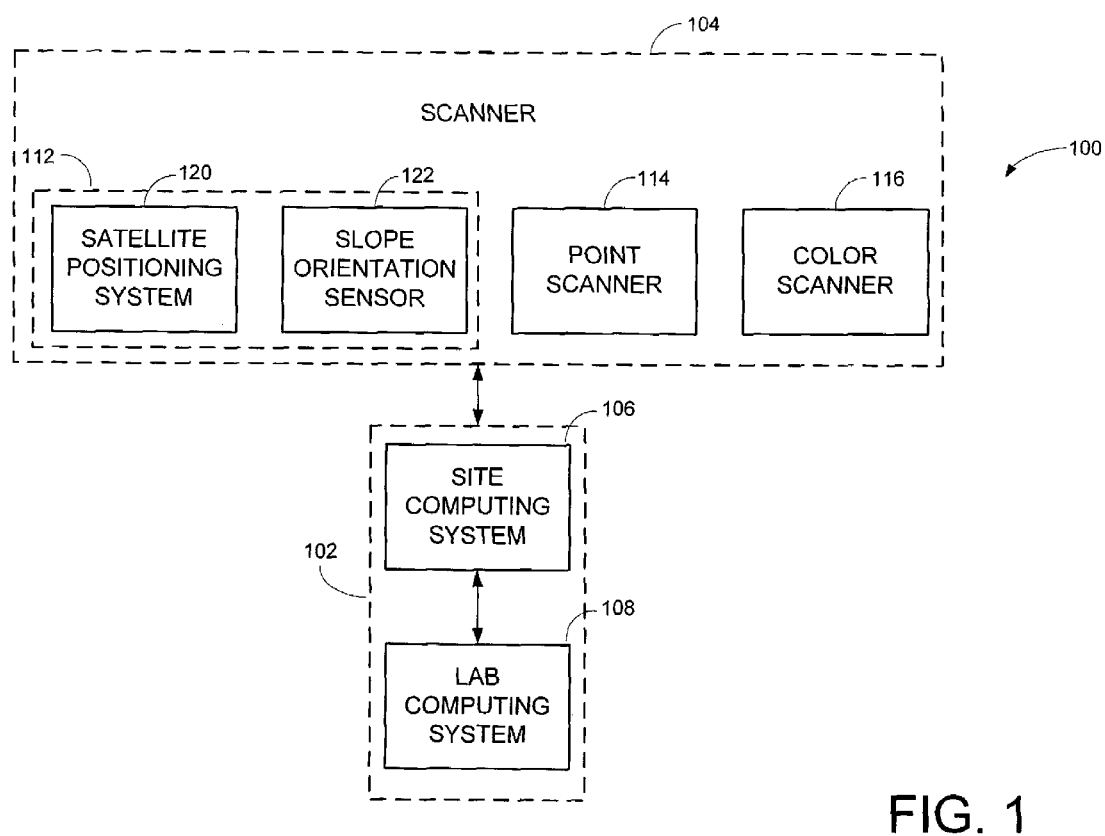
FIG. 1 is a block diagram of an image generation system.

FIG. 1 is a block diagram of an image generation system 100. The image generation system 100 includes a computing system 102 in communication with a scanner 104. The computing system 102 may be any device(s) capable of executing instructions, performing calculations, storing data, retrieving data and communicating with the scanner 104.

The computing system 102 may include features, functionality and capabilities available in handheld computers, laptop computers, desktop computers, server computers, mainframes, etc. The computing system 102 may include one or more processors, interfaces, data storage devices, communication interfaces, respectively, etc. In FIG. 1 the computing system 102 includes a site computing system 106 and a lab computing system 108. Communication between the site computing system 106 and the lab computing system 108 may occur through wireless, wireline, landline, and/or optical communication paths over one or more networks. Alternatively, data may be transferred between the site computing system 106 and the lab computing system 108 through a memory storage device such as a magnetic, optical, and/or electronic memory device. Similar communication techniques may be used between the computing system 102 and the scanner 104.

Although the site and lab computing systems 106 and 108 are illustrated as two separate systems, a single computing system, or three or more computing systems may also be used. In addition, multiple standalone cooperatively operating computing systems may comprise the site computing system 106 and the lab computing system 108.

The scanner 104 may include a positioning system 112, a point scanner 114 and a color scanner 116. The positioning system 112 may be any system that provides position information related to physical positioning of the scanner 104. The scanner position information may include a geographic position, a slope, and an orientation of the scanner 104. The positioning system 112 may include a satellite positioning system 120 and a slope orientation sensor 122.

The satellite positioning system 120 may be any positioning system that uses triangulation techniques to determine a geographic position of the scanner 104. The positioning system 112 may be a global positioning system (GPS), a differential global positioning system (DGPS) or a global orbiting navigation satellite system (GLONASS). The geographic position may be determined through navigational coordinates (e.g. latitude and longitude). In addition, the height above mean sea level of the scanner 104 may be determined by the satellite positioning system 120.

The slope orientation sensor 122 may comprise sensor(s) capable of detecting the level and facing direction of the scanner 104. The slope orientation sensor 122 may include at least one electronic sensor providing electrical signals indicative the of direction the scanner 104 is facing such as, north, south, etc., based on magnetic north. In addition, the slope orientation sensor 122 may include sensors providing electrical signals indicative of the pitch and roll of the scanner 104, based on a measurement of gravity.

The point scanner 114 may comprise a device capable of measuring an object to develop a point cloud representation of a geometric three-dimensional electronic image of the object. The point scanner 114 may include a coherent light or laser beam that is selectively directed to different points on an object. Based on a detected reflection of the laser beam, a distance between the scanner 104 and each of the points may be determined. The distances may be used to generate geometric point data representative of points on the surface of the object. The laser scanner may comprise a terrestrial 3D scanner of the LMS-Z series manufactured by Riegl Laser Measurement Systems GmbH of Austria.

A processor within the point scanner 114 may determine and record the geometric points to form a point cloud. The distance between each of the points on the object and the scanner 104 may be used to determine the point cloud. Point recording software that processes measured distance may be used. Such software may comprise RiSCAN software that is available from Riegl Laser Measurement Systems GmbH of Austria.

The color scanner 116 may be a device capable of sensing parameters representative of the color of an object. The color scanner 116 may selectively direct a beam of light at an object. Based on the detected reflections of the beam off of an object, color parameters may be determined. The detected parameters may be color points that may also be referred to as pixels. The processor in the point scanner 114 may also determine and record the color points.

Image data in the form of geometric points collected with the point scanner 114 may represent the geometric shape of the object. Image data in the form of color points (or pixels), collected with the color scanner 116 may represent the color of the object. The term "image data" refers to the combination of the geometric points and the color points.

The point scanner 114 and the color scanner 116 may be two independent scanning devices that operate synchronously to collect image data. The geometric points may be associated with the color points within a scan. The point scanner 114 may emit a light beam that is five centimeters away from a laser beam emitted by the color scanner 116. The color scanner 116 may be a line sensor that scans "lines" of color within a determined area of an object. Each line of color is defined by the width and length of a longitudinally extended beam of light of a determined width that is projected onto the object by the color scanner 116. The color sensor may scan within a determined area that is a vertical or horizontal rectangular area of a determined width and height. The rectangular area may be partitioned into smaller longitudinally extending areas of color (e.g., lines of color) that are sequentially scanned until the entire rectangular area has been scanned. Measurement of a line of color results in the detection of color point data that includes color points.

The period of time to detect color points may be longer than the period of time to detect geometric points. Thus, during a scan, the color scanner 116 may operate as a line sensor to detect a line of color points (pixels) in a determined area on the object for a period of time. During the same period of time, the point scanner 114 may detect individual geometric points within the same area. The computing system 102 may then associate the line of color points detected in the determined area with the geometric points detected in the same determined area to form image data.

Alternatively, the color scanner 116 may scan a determined area to collect a determined number of color points. As the area is scanned, the point scanner 114 may detect a determined number of geometric points in the same area. Since scanning the determined area with the color scanner 116 may take longer, fewer color points may be captured and associated with the more numerous geometric points. Gaps between the color points may be filled as discussed later. By synchronously directing the operation of the point scanner 114 and the color scanner 116, the computing system 102 may capture a scan of the object.

The scanner 104 may be positioned in a first geographic position adjacent to an object to be scanned, such as a building. The term "scan" or "scanned" should be broadly construed to include any data related to the object and/or the scanner 104 that is gathered by the scanner 104 during a determined period of time without geographic re-positioning of the scanner 104. The term "scans" refers to different geographic positions of the scanner 104 in which data is gathered.

During a scan, the navigational coordinates, slope, and orientation of the scanner 104 may be determined by the positioning system 112 and provided to the computing system 102. Determination of the navigational coordinates may include taking a number of different reference positions during the scan. The reference positions may be used to calculate an average reference position. The navigational coordinates of the reference position may then be used to describe the geographic position of scanner 104.

In addition, the point scanner 114 may scan the object and generate geometric point data in the form of a point cloud. At the same time, the color scanner 116 may scan the object and generate color point data. The geometric point data and the color point data may be synchronously captured by the computing system 102 as image data. Accordingly, at least one geometric point may be associated with at least one color point by the computing system 102.

The computing system 102 may associate the data provided by the satellite positioning system 120 and the slope orientation sensor 122 with the image data provided by the point scanner 114 and the color scanner 116. As a result of the scan, a geometric, three-dimensional, color, electronic image may be developed. The orientation, slope, and the geographic position of the scanner 104 may be associated with the three-dimensional electronic image. As used herein, the term "three-dimensional electronic image" refers to a representation of an object based on image data (geometric points and/or color points) and the position information collected during a single scan. Following completion of the scan in the first geographic position, the scanner 104 may be geographically relocated to a second geographic position and the scanning process repeated.

Figure 2:
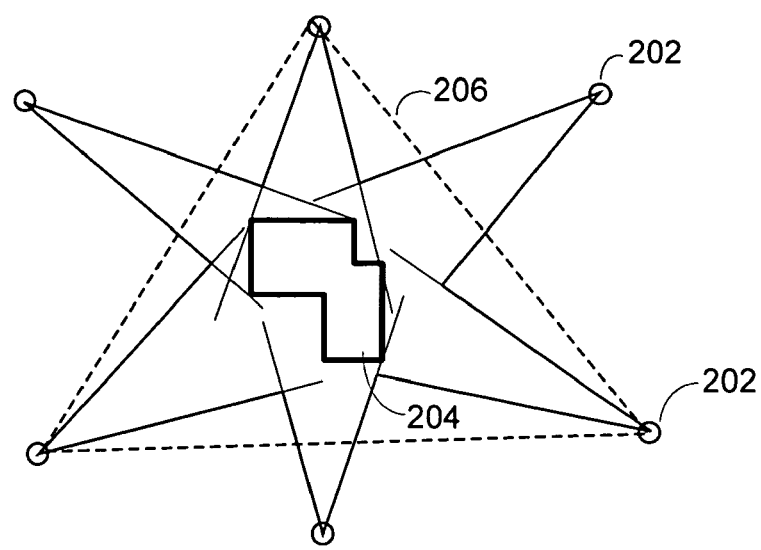
FIG. 2 is shows scanning positions about an object.

FIG. 2 shows some of the geographic positions 202 of the scanner 104 (FIG. 1) around an object 204. In FIG. 2 the object 204 is a building. The number of geographic positions 202 (and therefore different scans) may be determined based on the geometric shape of the object being scanned. Enough scans are performed to provide overlap of the geometric point data and the color point data collected by the scanner 104 during each scan.

In FIG. 2, three geographic positions representing points on a triangle 206 are identified as locations to perform scans. The triangle 206 is sized such that a boundary of the object 204 is completely enclosed within the triangle 206. Based on the shape and/or different surfaces of the object 204, three scans may be performed. Additional scans may however be needed to accurately capture the entire surface of the object. If the point scanner 114 is a laser scanner, surface areas of the object 204 that are not in line-of-sight of the scanner 104 may not be represented in just three scans. Accordingly, the scanner 104 may also be geographically positioned to in line-of-sight of the various features of the object and additional scans performed.

The number of scans (e.g. the number of three-dimensional electronic images) needed to generate a three-dimensional electronic model representative of the object may be minimized based on the symmetry of the object. Objects that include symmetrical portions may be reproduced electronically instead of scanning of its surfaces. In other words, where a scanned portion of the object is symmetrical with an un-scanned portion of the object, scanning of the un-scanned portion may be avoided. Instead, the scanned portion may be mirrored to represent the un-scanned portion.

Figure 3:
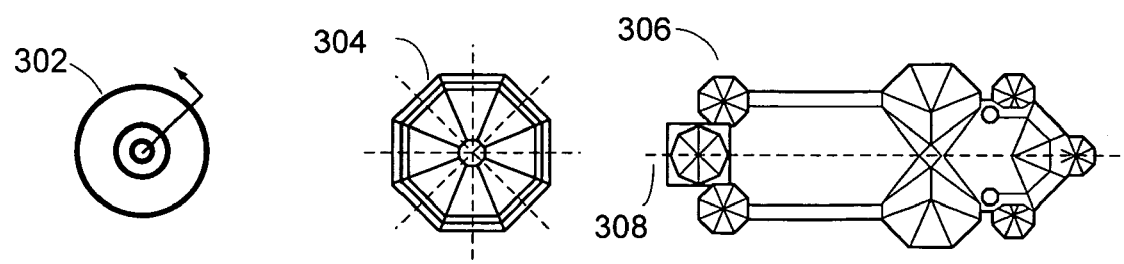
FIG. 3 shows various objects that may be scanned with the system of FIG. 1.

FIG. 3 illustrates some objects that may be scanned with the scanner 104. A first object 302 is rotationally symmetric. Objects with rotationally symmetrical areas may include television towers, water towers, etc. Where an object is rotationally symmetric, three-dimensional modeling may be performed based on two or more scans. A second object 304 has four symmetrical areas such that three-dimensional electronic modeling may be performed with four or more scans. A third object 306 is symmetrical along an axis 308. Thus, scans may be performed along only one side or more of the axis 308.

When all the scans of the object have been captured, the computing system 102 of FIG. 1 may combine the individual scans to form a three-dimensional electronic model representing the object. As used herein, the term "three-dimensional electronic model" refers to the combination of two or more three-dimensional electronic images. The combination of the individual scans (the three-dimensional electronic images) may be based on the geographic position of the scanner 104 during each of the scans. Accordingly, the geographic location of the scanner 104, as well as the pitch, the roll, the orientation and the height may be used to determine the proper amount of translation and rotation of each of the three-dimensional electronic images with respect to each other.

Following generation of the three-dimensional geometric model in electronic form, the surfaces of the model may be texturized using the computing system 102. Texturization involves identifying one or more source textures based on the visual appearance of the object to be scanned. The source textures may be used to create a transformation procedure to transform one or more source textures into complex textures. The complex textures may represent one or more different surfaces of the object. The transformation procedures may be associated with one or more surfaces within the three-dimensional electronic model. Complex textures may therefore be created from the source textures at the time the model is displayed.

The complete colored, texturized three-dimensional electronic models may be utilized in any application where computer generated images representative of the object are desired. For example, where the object is a building or landmark, the corresponding model may be exported to navigation software or other applications for displaying the object within a navigational map. In other examples, cities may use the objects for zoning and tourism. In addition, wireless service providers may identify signal paths, interferences, object heights, etc., from the three-dimensional electronic models.

The image generation system 100 provides an efficient and cost effective way to create three-dimensional electronic models of objects. Objects modeled with the image generation system 100 may be accurately scaled, colored and texturized without manually creating each three-dimensional electronic image. In addition, individual three-dimensional electronic images may be combined using the image generation system 100 to form a three-dimensional electronic model. Since the models are in electronic form, the data may be exported/imported to any other application where accurate and realistic three-dimensional electronic models are desired.

Figure 4:
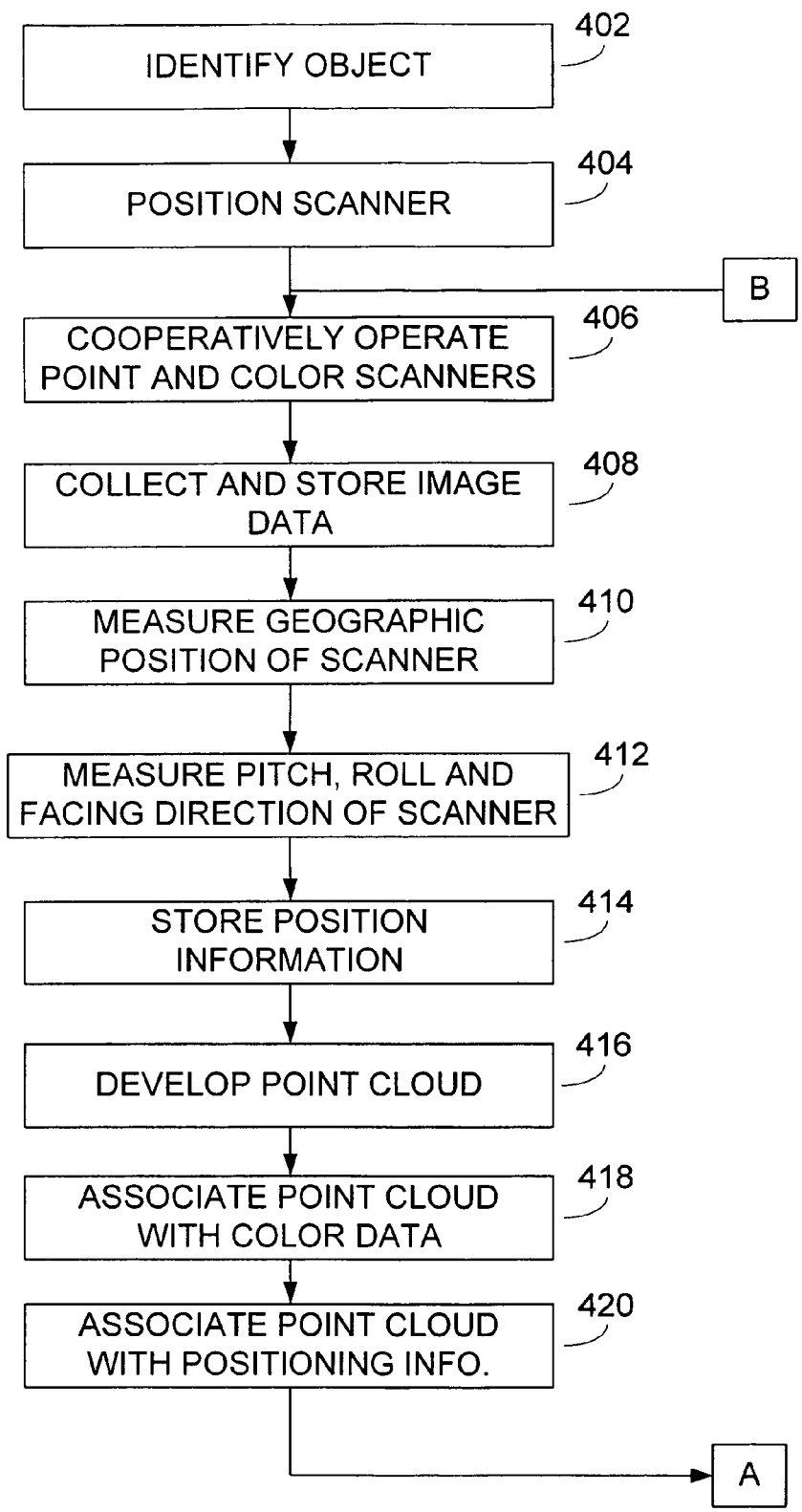
FIG. 4 is a partial flow diagram of an image generating method.
Figure 5:
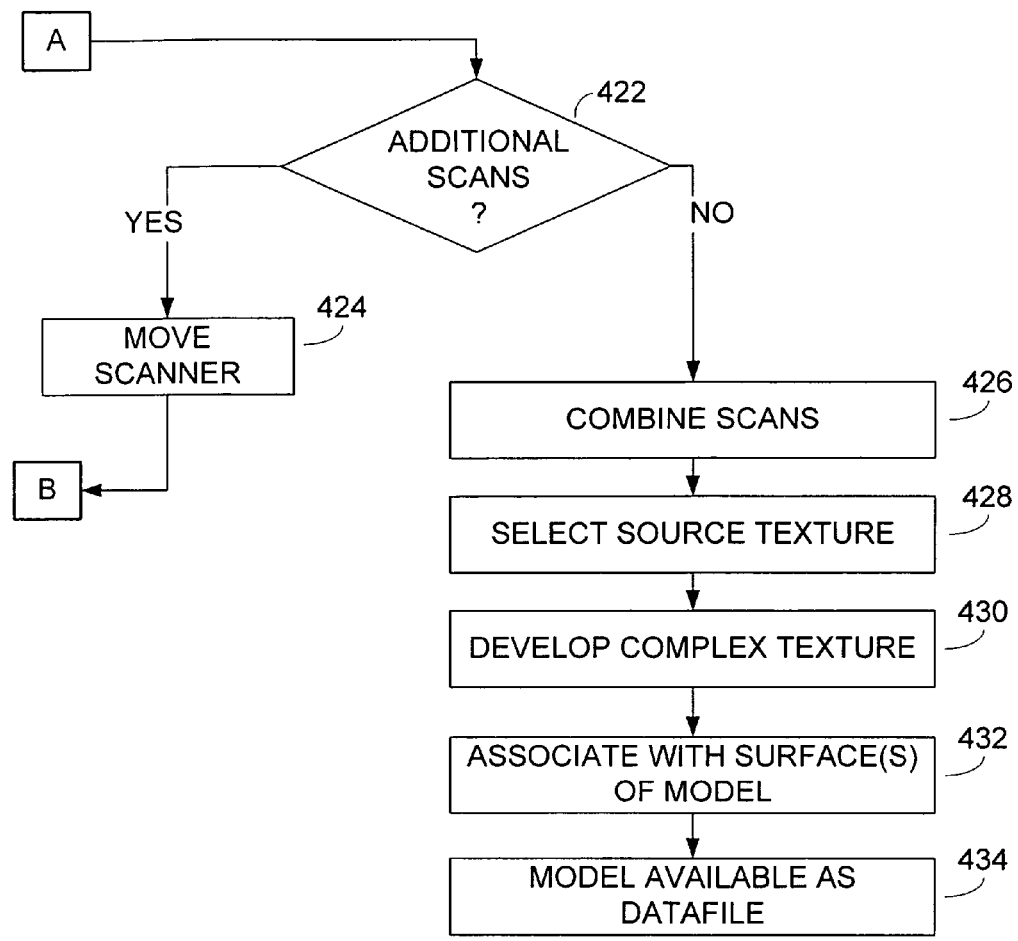
FIG. 5 is a partial flow diagram that couples the method of FIG. 4.

FIG. 4 is a process flow diagram illustrating operation of the image generation system 100 illustrated in FIG. 1. At block 402, the object to be scanned is identified. The scanner 104 is positioned in a first position adjacent to the object at block 404. At block 406, the point scanner 114 and the color scanner 116 are operated synchronously to scan the object. The geometric point data provided by the point scanner 114 and the color point data provided by the color scanner 116 are collected and stored as image data at block 408.

The satellite positioning system 120 performs measurements and records the geographic position of the scanner 104 at block 410. At block 412, the slope orientation sensor 122 performs measurements and records the pitch, the roll, and the orientation of the scanner 104. The position information is stored at block 414. At block 416, a point cloud is developed from the scan that is a three-dimensional electronic image representing the scanned surface(s) of the object. The geometric point data is associated with color point data to colorize the three-dimensional electronic image at block 418. The point cloud is associated with the positioning information at block 420.

At block 422, the method determines whether additional scans should be performed. If additional scans should be performed, the scanner may be moved to another geographic position at block 424 and the operation returns to block 406 to capture data and develop another three-dimensional electronic image. If no additional scans are needed, the image data from each of the three-dimensional electronic images is combined using the position information to develop a three-dimensional electronic model of the object at block 426. At block 428, one or more source textures are selected based on the actual texture present on the object. Using the source texture(s), complex texture(s) and a corresponding transformation procedure(s) are developed at block 430. At block 432, the source texture(s) and the transformation procedure(s) (e.g., the complex texture(s)) are associated with one or more surfaces of the three-dimensional electronic model. The three-dimensional electronic model is available as a datafile at block 434.

Figure 6:
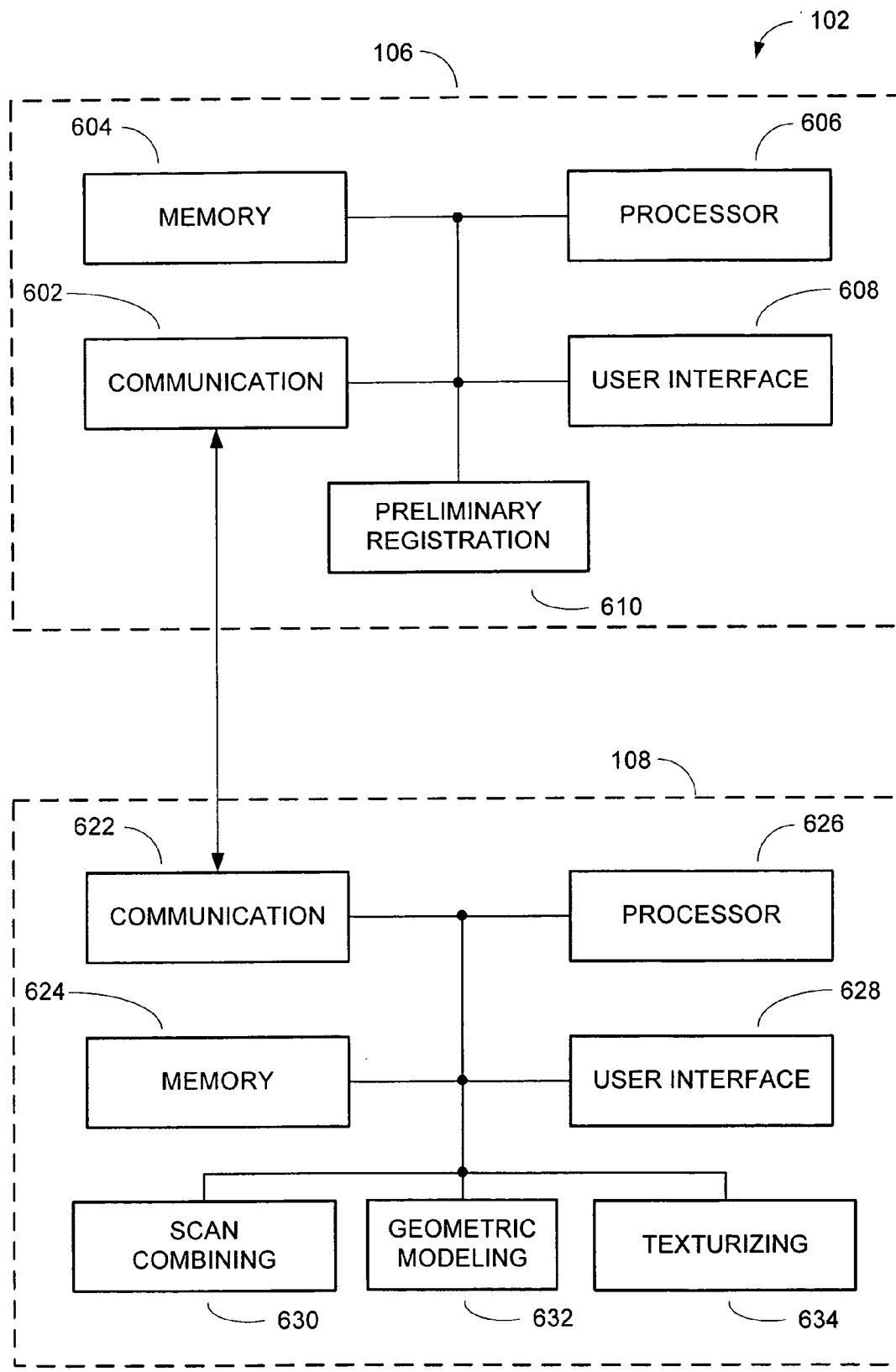
FIG. 6 is a block diagram of a computing system of FIG. 1.

FIG. 6 is a more detailed block diagram of an example computing system 102 that includes the site computing system 106 and the lab computing system 108. The example site computing system 106 includes a communication module 602, a memory module 604, a processor module 606 and a user interface module 608. In addition, the site computing system 106 may include a preliminary registration module 610. Fewer or greater numbers of modules may be used to illustrate the functionality of the site computing system 106.

The communication module 602 may be any device capable of provide communication with the scanner 104 (FIG. 1) and the lab computing system 108. In addition, the communication module 602 may include data acquisition functionality that provides input/output (I/O) capability related to the scanner 104 (FIG. 1). The I/O capability may include input and output channels, communication ports, signal conversion, filtering, buffering, wireless communication, wireline communication, optical communication and/or any other I/O related capability. Input and output signals may include analog signals, digital signals, and communication protocols, such as RS422, TCP/IP, Bluetooth, 802.11, SMS, proprietary protocols, and any other communication protocols.

The memory module 604 may be a memory device or a medium where data may be stored and retrieved. The memory module 604 may include electronic memory such as a flash memory, a random access memory (RAM) and/or magnetic memory such as a hard drive(s), an optical disk(s), etc. Data stored in, and accessed from, the memory module 604 may include scans and other scanner related data. In addition, operating instructions, such as computer code/software related to the functionality and operation of the modules within the image generation system 100 (FIG. 1) may be stored and accessed. Accordingly, instructions and data stored in the memory module 604 may provide the functionality and operative cooperation of the other modules in the site computing system 106. Although illustrated as a single module, the memory module 604 may include multiple memory modules. The multiple memory modules may support the other modules of the image generation system 100.

The processor 606 may be any control unit or computer based device(s) capable of interfacing with the communication module 602, the memory module 604 the user interface module 608 and the preliminary registration module 610. The interface with the communication module 602 may include receiving incoming signals and/or data and directing the generation of outgoing signals and/or data. The Interface with the memory module 604 may include executing instructions stored in the memory module 604 to generate, store, manipulate and/or extract data within the memory module 604 related to the operation of the image generation system 100 (FIG. 1). The processor 606 may also coordinate operation of the site computing system 106 and exchanges of data between the communication module 602, the memory module 604, the user interface module 608 and the preliminary registration module 610.

The user interface module 608 may include functionality supporting buttons, display screens, touch screens, indicators, transducers and/or any other mechanisms providing an interface for a user to the image generation system 100 (FIG. 1). In addition, the user interface module 608 may provide visual renderings of the three-dimensional electronic images, geometric points, color points, three-dimensional electronic models, position information, and any other data collected by the image generation system. Operation of the user interface module 608 may be based on instructions executed by the processor 606 and inputs provided by the user.

The preliminary registration module 610 may cooperatively operate with the user interface module 608 to view and manipulate the scans based on instructions executed by the processor 606. Manipulation of the scans may involve a user manually moving and rotating the three-dimensional electronic images associated with each of the different scans. The point clouds may be moved and rotated to fit together and form a preliminary three-dimensional electronic model from the three-dimensional electronic images.

The process of joining the individual scans to form a three-dimensional electronic model is called "registration." The registration may be performed manually on site, and therefore may be referred to as "preliminary registration" or "provisional registration." Since the manipulation of the scans by the user occurs at the site where the object is scanned, the user may visually compare the preliminary three-dimensional electronic model to the actual object when combining the different three-dimensional electronic images.

In addition, the preliminary registration module 610 may perform automated manipulation of the scans to form the preliminary three-dimensional electronic model. Automated manipulation may involve use of the point clouds and the position information from each of the scans to form a preliminary three-dimensional electronic model. Following automated manipulation, the user may further manipulate the various point clouds manually as previously discussed. When manipulation is complete, the preliminary three-dimensional electronic model may be provided to the lab computing system 108.

Alternatively, the scans may be provided to the lab computing system 108 without manipulation. Where the scans are not manipulated with the site computing system 106, the preliminary registration module 610 may be omitted. Accordingly, the as-collected scans may be transmitted or otherwise provided to the lab computing system 108 for further processing.

The lab computing system 108 illustrated in FIG. 6 includes a communication module 622, a memory module 624, a processor module 626 and a user interface module 628. In addition, the lab computing system 108 may include a scan combining module 630, a geometric modeling module 632 and a texturizing module 634. In other examples, fewer or greater numbers of modules may be used to illustrate the functionality of the lab computing system 108.

The communication module 622, the memory module 624, the processor module 626 and the user interface module 628 may be similar to the previously discussed communication module 602, the memory module 604, the processor module 606 and the user interface module 608 included in the site computing system 106. The processor module 626 may control the overall operation of the lab computing system 108 by executing instructions stored in other modules including the memory module 624. In addition, the processor module 626 may allow cooperative operation of the communication module 622, the memory module 624, the user interface module 628, the scan combining module 630, the geometric modeling module 632 and the texturizing module 634.

The lab computing system 108 may perform a registration process referred to as a "precise registration." The precise registration occurs when the geometric points in the point cloud of each three-dimensional electronic image are joined by the scan combining module 630. In addition, the joined point clouds may be precisely fit together to form a final three-dimensional electronic model using the geometric modeling module 632.

When preliminary registration has been performed, any of three techniques may be used by the lab computing system 108 to perform precise registration. In a first technique, the individual point clouds representing each electronic three-dimensional image may be combined to form a model point cloud that includes all the image data of the individual point clouds. Manipulation to align the point clouds may involve identifying matching geometric points within the different scans. Once the various point clouds are aligned and combined to form the model point cloud, surfaces within the model point cloud may then be determined.

Instructions executed by the processor 626 may join the geometric points within the model point cloud to represent a surface. Surfaces may be determined by the scan combining module 630 from the geometric points. Determination of surfaces may involve analyzing geometric points with respect to surrounding geometric points within the point cloud.

A surface that includes at least two geometric points may first be identified. A determined distance between the identified surface and another geometric point may be used to determine if the geometric point is part of the identified surface. For example, a normal vector may be identified between a surface and a geometric point. If the geometric point is within a determined distance, such as five centimeters, the geometric point may be assigned to the surface and the surface re-calculated. All geometric points within a determined distance of each other may be considered for inclusion as part of a surface. If a geometric point is within a determined distance of multiple surfaces, the geometric point may be at a corner or edge of the object and may therefore be assigned to each of multiple surfaces. Once surfaces have been determined within the model point cloud, the joined point clouds may be precisely fit together to form a final three-dimensional electronic model using the geometric modeling module 632. In addition, textures may be associated with the surfaces.

In a second technique, surfaces are individually determined in each point cloud. The surfaces may be determined based on the geometric points in the point cloud as previously discussed. Once the surfaces are identified, textures may be associated with the surfaces. The point clouds may then be combined. Combination of the point clouds in this technique may be based on the surfaces and/or the textures instead of the individual geometric points in each point cloud. Once the point clouds are combined, the joined point clouds may be precisely fit together to form a final three-dimensional electronic model using the geometric modeling module 632.

In a third technique, surfaces are individually determined in each point cloud from the geometric points. Once the surfaces are determined, an outline of each surface is determined. The outlines of each surface form a framework depicting each of the three-dimensional electronic images. The frameworks of each scan may then be combined to form a framework model. Combination of the frameworks may be based on alignment of the outlines of the surfaces from the various point clouds. Once the point clouds are joined, the joined point clouds may be precisely fit together to form a final three-dimensional electronic model using the geometric modeling module 632. In addition, textures may be associated with the surfaces.

When preliminary registration has not been performed, precise registration may involve joining the color points and the geometric points in each point cloud to form lines. The color points and geometric points may be joined by instructions in the scan combining module 630. The point clouds may be converted from a three-dimensional electronic image represented with geometric points and color points to the same three-dimensional electronic image represented with one or more lines. A selected number of geometric points are therefore converted into a single one-piece line.

Each of the lines may be in the form of outline data. The outline data may provide significantly more efficiency in data manipulation capability since a single line may replace a relatively large number of geometric and color points in a point cloud. For example, when the point cloud is representative of an object that is a building, the scan combining module 630 may execute instructions to generate lines for sections of the building from a three-dimensional electronic image. Outline data files may therefore be generated for each scan.

Figure 7:
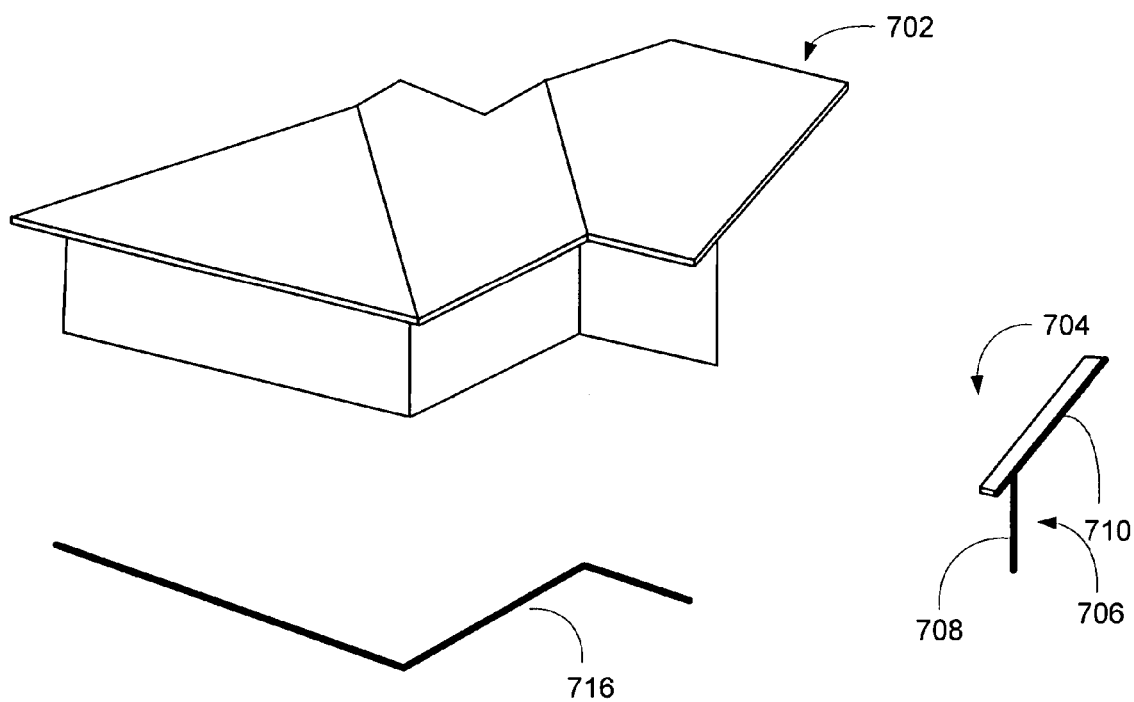
FIG. 7 is an electronic three-dimensional image developed with the image generation system of FIG. 1.

FIG. 7 is a three-dimensional electronic image 702 developed from scanning an object that is a house. To generate outline data files, the three-dimensional electronic image 702 developed from the point cloud of a scan may be partitioned into sub-images 704. The three-dimensional electronic image 702 may be partitioned into sub-images 704 that are each about one meter thick.

Partitioning into sub-images 704 involves "slicing" the point cloud into segments. The "slices" may be vertical, horizontal, sloped, etc. Within each of the sub-images 704, a line 706 may be developed that is a single one-piece line. The line 706 is representative of the sub-image (e.g. the segment of the point cloud). In the example of FIG. 7, a first part 708 of the line 706 may represent the portion of the point cloud forming a first wall of the house. A second part 710 of the line 706 may represent a first half of the roof. In addition, the object such as the building may be partitioned horizontally into a sub-image(s) that is a partial floor plan 712. The partial floor plan 712 may similarly be developed into a line. An application capable of creating sub-images is Cyclone software available from Cyra Technologies, Inc. of San Ramon, Calif.

Each sub-image represented by a line may be stored in an outline data file and provided to the geometric modeling module 632 (FIG. 6). Each of the outline data files may have .dxf or .dwg file extensions. Since each portion of the point cloud depicting each sub-image has been reduced in complexity and size to a line, required data storage capacity, data transfer capacity and processing power related to the three-dimensional electronic images may be reduced. In addition, manipulation of the lines from each of the scans simplifies the creation of a three-dimensional electronic model.

The geometric modeling module 632 in FIG. 6 may include instructions to complete the precise registration of the scans by precisely combining the three-dimensional electronic images to develop a three-dimensional electronic model. In addition, the geometric modeling module 632 may add geometric-related data to the scan data to develop the three-dimensional electronic model. A geometric modeling module 632 may include ArchiCAD® software available from Graphisoft® U.S., Inc. of Newton, Mass.

The surfaces identified by the scan combining module 630 within each three-dimensional electronic images may be assembled by the geometric modeling module 632 into the three-dimensional electronic model. Alternatively, where each of the three-dimensional electronic images have been reduced to geometric sub-images in the form of lines, the lines may be similarly assembled by the geometric modeling module 632 to form the three-dimensional electronic model. Where a preliminary three-dimensional electronic model was provided from the site computing system 106, the three-dimensional electronic images may be further manipulated during precise registration with the geometric modeling module 632 to form a final three-dimensional electronic model. The portion of the precise registration performed by the geometric modeling module 632 may involve more detailed processing of the various point clouds to more accurately fit the various three-dimensional electronic images together into a geometric image.

The detailed processing to fit the three-dimensional electronic images together more precisely to form the three-dimensional electronic model may be automated, manual or some combination of manual and automatic. Manipulation and combination of the three-dimensional electronic images during the detailed processing may involve instructions to change the position and/or rotation of the three-dimensional electronic images to precisely fit together. The three-dimensional electronic images may be manipulated with respect to each other based on the position information determined by the positioning system 112. Where the three-dimensional electronic images have been partitioned into lines, the lines representative of the sub-images may be similarly combined and manipulated with the geometric modeling module 632.

Manipulation and combination of the three-dimensional electronic images may involve identifying geometric points within the point cloud of a first three-dimensional electronic image that are close together (such as those points forming a surface) and measuring the distances between the geometric points in the first three-dimensional electronic image and geometric points in a second three-dimensional electronic image. Using iterative processing, such as Gaussian based calculations, geometric points in the first three-dimensional electronic image that are similar to geometric points in the second three-dimensional electronic image may be identified.

Based on an error between the similar geometric points in the different three-dimensional electronic images, iterations of manipulation and recalculation may be performed until the error is minimized. The error may be determined based on a squared error minimization technique involving the summation of all squared distances between neighboring geometric points of different three-dimensional electronic images. Where the point clouds have been partitioned into sub-images, the distances between lines may similarly be used to manipulate and combine the lines.

The color may also be manipulated during precise registration by the geometric modeling module 632 to generate the three-dimensional electronic model. The color points may be collected synchronously with the geometric points. As such, color points may be associated with the geometric points in the three-dimensional electronic images. For example, one color point may be associated with nine geometric points; therefore the color point may be interpolated between the geometric points.

Alternatively, where the color points are not collected synchronously with the geometric points, stretching and skewing may be utilized to associate color with the geometric points. For example, where a photograph is used for the color of an electronically represented object, the color(s) in the photograph may be stretched and skewed to fit the geometric surfaces represented with the geometric points or the lines.

During operation, the translation and rotation information of how the individual three-dimensional electronic images were combined may be utilized to map color pixels to the geometric points. Differences in color from the same area in different scans may be resolved by the geometric modeling module 632 using picture processing techniques such as, image comparison of similar images, pixel comparison of similar pixels or any other picture processing techniques to resolve such differences among different scans. In addition, the navigational coordinates may be utilized to determine differences in the angle of the suns rays (e.g., shadows, etc.) during different individual scans. Further, gaps in the color(s) of the surface(s) may be filled between color points. The filling of gaps may be completed by, for example, interpolating the surrounding colors with a rasterization process.

The rasterization process may be performed by the geometric modeling module 632 by dividing a surface of a three dimensional electronic image into a plurality of triangles. The triangles may be non-overlapping and formed by selectively connecting the geometric points within the surface to form point triangles. Lines between the geometric points may depict the three sides of each point triangle. In addition, border triangles may be formed.

The border triangles may be formed between geometric points around the periphery of the surface and a border. The border may be formed to surround the surface around the outer edge of the surface. The border triangles may be formed with a geometric point such that two of the three sides each of the border triangles extending from the geometric point to the border. The third side of each of the border triangles may be formed by the border.

The color points associated with the surface may be used to create shading between the existing color points within each of the triangles. The shading may be created by adding new color points in each of the triangles between the existing color points. The number of new color points that are added may be based on the amount of detail (resolution) that is desired on the surface.

Determination of the new color points may be based on color blending by moving within the color spectrum between the existing color points. Color blending may be performed by interpolation between existing color points, the difference in distance of a new color point from various existing color points, and/or any other color evolving technique to move within the color spectrum between the existing color points. As a result of the rasterization, shading of the area of the surface defined by each of the triangles may stay the same, may have slight adjustment to the color and/or may have significantly different the colors. Each triangle may therefore include any number of colors or color variations depending on the existing color points in each triangle and/or existing color points in adjacent triangles.

The geometric modeling module 632 may also organize the three-dimensional electronic model into a determined structure. The structure of the electronic representation of an object modeled with the geometric modeling module 632 may be divided into layers. The layers of the three-dimensional electronic model may include a first layer that is a simple layer, a second layer that is a construction layer, a third layer that is a position layer, a fourth layer that is a library layer and a fifth layer that is a picture layer. The simple layer may include the three-dimensional geometric structure representative of the scanned object. The construction layer may include construction elements, such as lines, curves, splines, points, text information, comments and any other creation related information that has been used during the construction process of the three-dimensional electronic model.

The position layer includes information related to the positions of the scanner 104 when the scan data was collected. Position layer information may include a site plan sketch and a marked position. The marked position may provide geographic coordinates as well as the slope and the height obtained by the position system 112 (FIG. 1) during scanning. The information may be displayed within the site plan sketch.

The site plan sketch may be a displayable illustration that is to the same scale, position and orientation as the three-dimensional electronic model. Variance from a determined direction, such as north, may be identified in the site plan sketch. The site plan sketch may also display the three-dimensional electronic model. The orientation of the three-dimensional electronic model in the site plan sketch may be such that the north orientation of the object is adjacent to the upper edge of the display.

The library layer may include library elements in the form of instructions and data. The library elements may be constructed for use in the modeling process to represent various aspects of the object being modeled. The library layer may also include the transformation procedures for transforming source texture(s) to form complex texture(s). The picture layer may be an optional layer. Where photographs are taken of an object, the picture layer may include sketches of the geographic positions of the photographer when the pictures were taken, as well as unique identification, such as the name, of the photographer.

The model size of the geometrical structure of each object being modeled with the three-dimensional electronic model may be scaled to a uniform size. An object may be geometrically represented at a determined scale by the model with a plurality of polygons. The number of polygons chosen to represent the object may be chosen based on desired resolution, hardware limitations or any other consideration effecting performance or display. For example, where it is desirable to render ten different electronic models on a display in one second, and the graphics processor is limited to rendering 10,000 polygons in a second, up to 1000 polygons may represent the geometric shape of an object in a three-dimensional electronic model. Each of the polygons may include n vertexes, where $n > 2$.

The structure of the three-dimensional electronic models may consist exclusively of one or more planar flat planes. Each of the planes, such as walls, ceilings, roofs, etc. may have a depth (thickness) of zero. Where color points were not captured synchronously with geometric points, characteristic surfaces of the planes within the three-dimensional electronic model may be presented in a determined color. The color may generally resemble the displayed material, such as brick=red, vegetation=green, etc. In addition, visual representation of features on the surfaces of the various planes such as doors, windows, colored facade patterns, etc. are not modeled. The representation of the features on the surfaces of the object may be realized by adding texture to the three-dimensional electronic model.

The three-dimensional electronic images forming the three-dimensional electronic model should not be visually represented as being overlapped. As such, edges of planes as well as outer edges contacting each other within the model should be closed. In other words, the visual display of the three-dimensional electronic model should not include any holes, slashes or other breaks that are not present in the visually perceived actual object. Further, volume compounds of the three-dimensional electronic model are closed. For example, where the object is a building, the ground floor of the representative three-dimensional electronic model may have a closed outline.

The geometric modeling module 632 may also include height compensation. The height compensation may be applied within the three-dimensional electronic model to simulate slopes and other gradients. The graphical image representative of an object on the display may be projected on a plane. The plane may be representative of a resting surface such as the earth's surface, parking lots, streets etc. Where the resting surface is sloped, such as to form an incline plane, height compensation may be applied.

Figure 8:
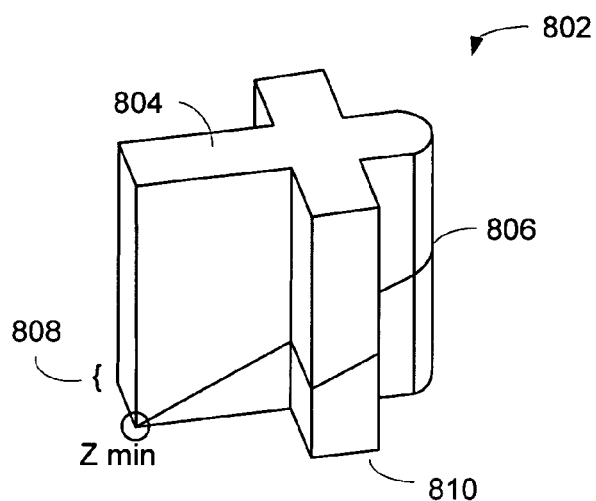
FIG. 8 is second electronic three-dimensional image developed with the image generation system of FIG. 1.

FIG. 8 illustrates an example three-dimensional electronic image 802 that is representative of an object 804 positioned on an inclined plane 806 such as a hillside. The illustrated object 804 is a building. Objects positioned on significantly inclined planes that are scanned may result in a three-dimensional electronic model that does not account for the inclined plane. In other words, the object may appear to be represented with a portion missing.

The geometric modeling module 632 may not "even-up" the outer edges of the model by making changes in elevation without a noticeable difference in the geometric shape of the represented object 804. The outline of the object 804 includes a ground floor 808. The ground floor 808 may provide a base for the construction of an architrave block 810 to compensate for variations in height. The architrave block 810 may be generated from the ground floor 806. Adjustment of the architrave block 810 to fit the object 804 may be based on an adjustment point ($Z_{min}$).

Figure 9:
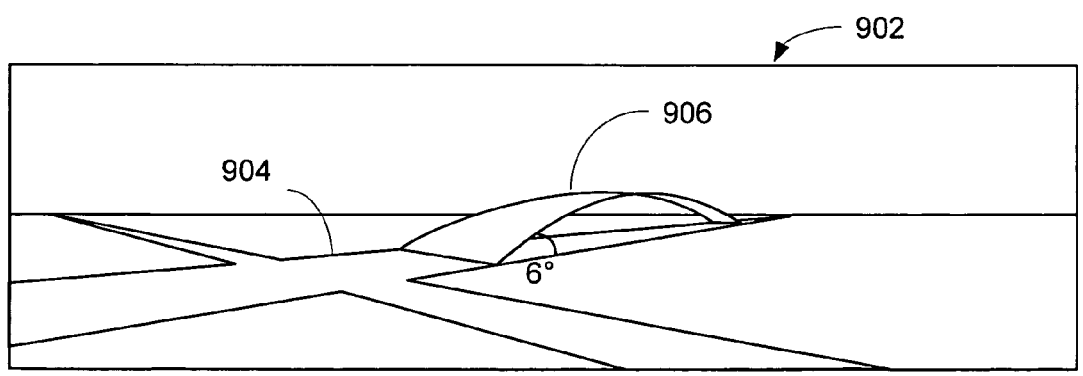
FIG. 9 is a third electronic three-dimensional image developed with the image generation system of FIG. 1.

FIG. 9 illustrates another example of a three-dimensional electronic image 902. The three-dimensional electronic image 902 includes representations of a street surface 904 and a bridge 906. The transition between the street surface 904 and the bridge 906 may be represented as floating. The term "floating" refers to the angular relationship between the street surface 904 and the bridge 906. In the illustrated example, the angles flanking each other may be different up to about six degrees.

The texturizing module 634 illustrated in FIG. 6 is a texturizing system that includes instructions to generate one or more textures for one or more surfaces of a three-dimensional electronic model. Textures may also be generated with the texturizing system for the surface(s) of three-dimensional electronic images or any other form of electronic representation of an object. Accordingly, the textures created with the texturizing system are not limited to representation of the surfaces of three-dimensional electronic images and/or models generated as previously discussed. Further, the texturizing system is not limited to operation in the previously described example of an image generation system. Instead, the texturizing system may be a standalone system, or may cooperatively operate with any system capable of providing electronic images.

The texturizing module 634 may include instructions to generate new textures. The new textures may be generated by modification and/or combination of existing textures. The texturizing module 634 may also include instructions to support a texture library accessible to multiple users. The textures in the texture library may be used to texturize three-dimensional electronic models of objects such as buildings.

The texture module 634 may comprise a portion of the image generation system 100 that is used for rapid texture generation. The texture module 634 may generate new or adjusted textures (complex textures) based upon existing textures (source textures). A unique part(s) of a building may be taken from a photo or picture and included as source texture(s). The texture of the various parts of the building may be represented by the source texture, a different source texture and/or transformation of one or more source textures to form complex textures.

Accordingly, a significant expense in computer memory and texture capture and/or generation may be avoided by reduction in the generation of possibly hundreds of different textures from photos or pictures. The savings may be realized without reverting to simple generic textures which may be non-descript and/or unattractive. The nearly boundless possibilities of combinations of source texture may produce desirable complex textures that are adapted to the three-dimensional electronic model without consuming excessive memory. The procedure to generate a complex texture may be stored instead of an image of the complex texture. Alternatively, the complex textures themselves may be stored.

Figure 10:
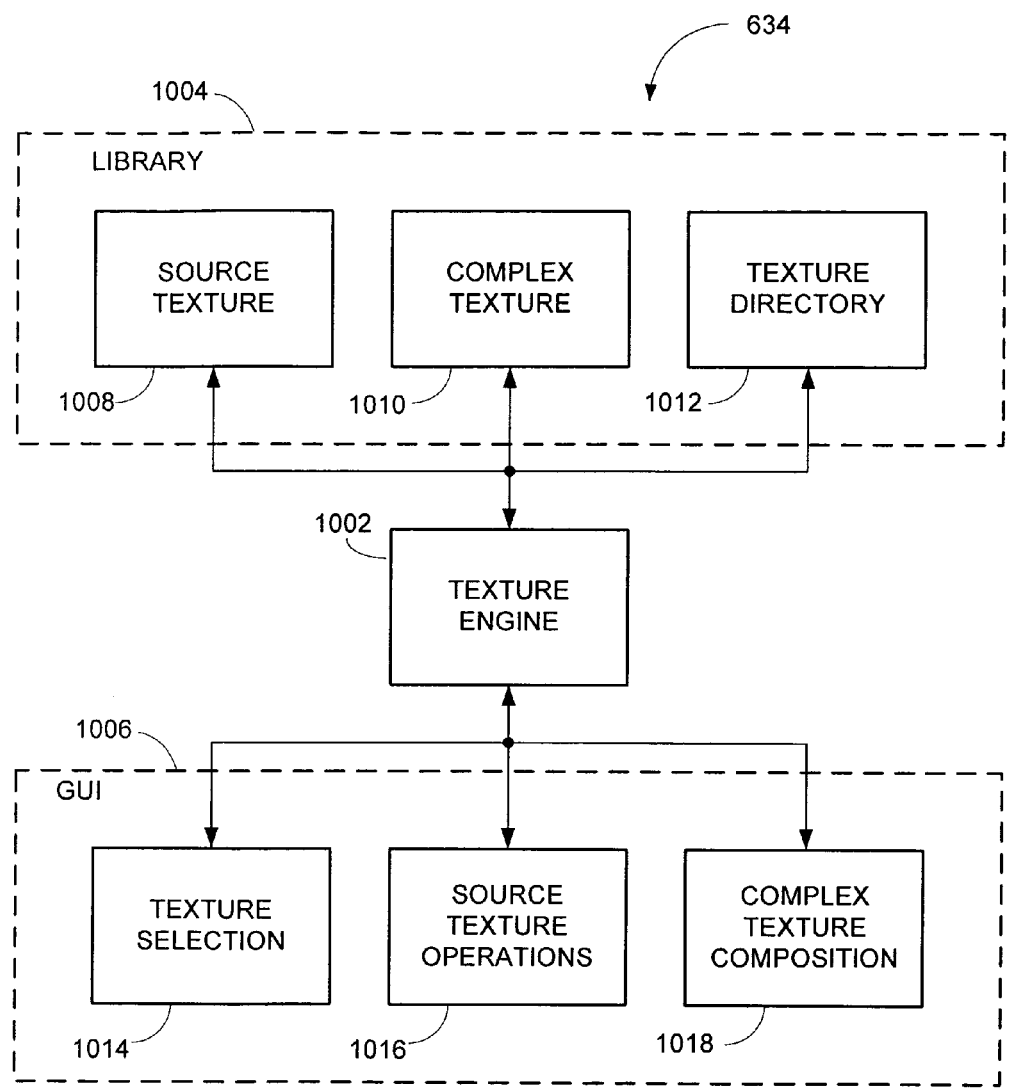
FIG. 10 is a block diagram of a texturizing module of FIG. 6.

FIG. 10 is a more detailed block diagram example of the instructions within the texturizing module 634 illustrated in FIG. 6. The texturizing module 634 includes a texture engine 1002, a library component 1004 and a graphical user interface (GUI) component 1006. In other examples, fewer or greater numbers of engines and components may be illustrated to represent the functionality of the texturizing module 634. In addition, in other examples, the texturizing module 634 may be operated external to, and independent of, the lab computing system 108.

Instructions in the texturizing module 634 may be developed in C++, Visual Basic, UNIX, Java, or any other source code language. Development of the texturizing module 634 may be with Microsoft® Visual Studio, J Builder from Borland, C++ Builder from Borland or any other development tools. In other examples, other forms, formats and/or tools may be used to develop the instructions in the texturizing module 634.

The texture engine 1002 may include instructions to provide the overall operational functionality of the texturizing module 634. In addition, the texture engine 1002 may coordinate the cooperative operation and control of the library component 1004 and the graphical user interface component 1006. The texture engine 1002 allows the texturizing module 634 to operate on platforms such as Windows® 9x, NT, 2000 and XP or any other platform with or without network access. Accordingly, in one example, the user interface of the texturizing module 634 may have a "windows like" look and feel. The texturizing module 634 may be designed for operation by users such as architects, designers, etc., and therefore may not require the expertise of a software developer to operate. In addition, the texturizing module 634 may be equipped with safeguard features providing protection from detrimental events initiated erroneously by untrained users.

The library component 1004 represents the texture library and may catalog textures that are the basic elements of the texturizing module 634 in the texture library. The example library component 1004 includes a source texture category 1008 and a complex texture category 1010 that indicate the types of textures that may be cataloged. In other examples, the types of textures may be cataloged in greater or fewer numbers of categories. In addition, the library component 1004 may include a texture directory 1012.

As used herein, the term "texture" or "textures" refers to a realistic representation of the actual color(s) and/or feature(s) that are visually perceived on one or more surfaces of an object. Accordingly, the "texture" applied to a surface(s) of an object represented in electronic form almost replicates the feature(s) on the surface(s) of the object that would be visually perceived when viewing the actual object. For example, the texture of the surface of a building may include windows, sculptures, moldings, railings, holes, brickwork, shingles, etc. The texture may also represent a surface that is wet, shaded and/or sunny as well as representing reflected light, light images projected onto the surface(s), etc. Thus, texture may be used to replicate or almost reproduce structural features, artistic features, lighting and any other visual features present on one or more surfaces of an object, as if the actual object were being observed.

The source texture category 1008 includes at least one source texture. A source texture is an image in electronic form that may be stored in the source texture category 1008. The image may be in the form of an image file such as a bitmap, a JPEG, a TIF, a DWG or any other electronic form of an optical depiction of a person, an object or any other visually perceived subject matter. Pixels present within the electronic form of the image may be red, green, blue and transparent to represent the texture of the image. For example, a source texture may be created from a digital photograph taken with a digital camera. An example of a source texture is a bitmap image of the facade of a building.

The complex texture category 1010 includes complex textures. Complex textures are composed of one or more source textures. The complex textures are represented within the complex texture category 1010 with a transformation procedure. The transformation procedures may be stored in the complex texture category 1010. The transformation procedure provides manipulation and/or combination instructions that are applied to one or more source textures in the source texture category 1008 to form one or more complex textures. Accordingly, the complex textures include references to source texture(s) from which the complex textures are composed.

Transformation of one or more source textures based on a transformation procedure may include one or more graphic operations performed on one or more source textures. The graphic operations may include for example, clipping, colorizing, rotating, mirroring, repeating, scaling, positioning, ordering, and/or any other graphically related manipulation of one or more source textures.

Figure 11:
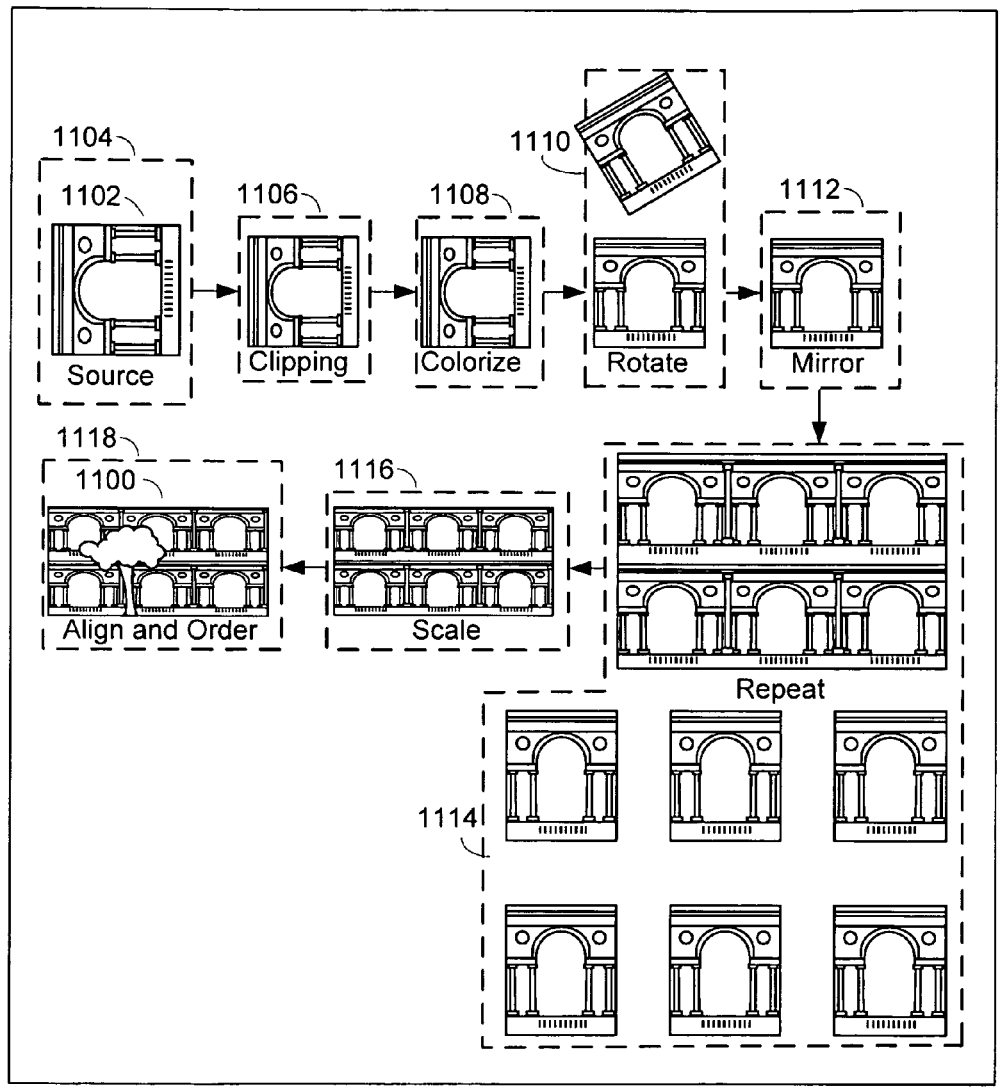
FIG. 11 is a process that may be performed with the texturizing module of FIG. 10.

FIG. 11 illustrates the results of each graphic operation within an example transformation procedure to compose a complex texture 1100 using a source texture 1102. The source texture 1102 is identified by the transformation procedure at block 1104. Clipping is applied by the transformation procedure at block 1106 since only a part of the source texture 1102 is needed. At block 1108, colorizing is applied by the transformation procedure by multiplying the source texture with one or more colors. The source texture 1102 is rotated by the transformation procedure at block 1110. In the illustrated example, the source texture 1102 is rotated in almost 90 degree steps such that the space between the rotated source texture 1102 and the new bounding rectangle is filled with transparent color. In other examples, the rotational steps may be larger or smaller.

At block 1112, the source texture 1102 is mirrored on the x and y-axis. The source texture 1102 is repeated multiple times along the x and y axis at block 1114. The repeated source textures 1102 may be contiguous. Alternatively, a gap filled with transparent color may be defined between each of the repeated source textures 1102. At block 1116, the repeated source textures 1102 are scaled along the x and y-axis. The scaling may be performed without filtering. Alternatively, the scaling may be performed using bilinear filtering or any other scaling or filtering technique.

The transformed source textures 1102 may be positioned by alignment and ordering to form at least a portion of the complex texture 1100 at block 1118. Accordingly, multiple transformed source textures 1102 may be aligned to create the complex texture 1100. The multiple transformed source textures 1102 may be aligned contiguous with one another. Alternatively, two or more transformed source textures 1102 may be aligned to overlap. Where there are overlapping source textures 1102, an overlap order may be designated as part of the transformation procedure. The overlap order provides a particular order in which the transformed source textures 1102 are placed to form the complex texture 1100.

The complex texture 1100 may initially be filled with black and/or fully transparent textures. The source textures 1102 may be transformed and positioned within the complex texture 1100 according to a determined logic equation(s). For example, the logic equations for transformation of the source texture 1102 may be:

$$R0 = R0*(1-A1) + R1*A1$$

$$G0 = G0*(1-A1) + G1*A1$$

$$B0 = B0*(1-A1) + B1*A1$$

$$A0 = A0*(1-A1) + A1*A1 \quad \text{EQUATION 1}$$

Where R0, G0, B0, A0 are the colors (R=red, G=green, B=blue) and transparency (A) of the complex texture 1100 and R1, G1, B1, A1 are the color and transparency of the source texture 1102. In this example, the color and transparency of the source texture 1102 is in a range of about 0.0-1.0.

In FIG. 10, the texture directory 1012 may provide a tree structure for the texturizing module 634. The tree structure of the texture directory 1012 may provide a catalog of identifiers. Directories within the texturizing module 634 may be designated with a unique directory identifier within the texture directory 1012. The unique directory identifier may be any combination of integers and/or letters that are unique to a particular directory. In addition, within each of the directories, a unique texture identifier may be designated for at least one source texture(s) and/or at least one complex texture(s). The unique texture identifier may similarly be any combination of integers and/or letters to uniquely identify textures. The unique directory and texture identifiers may be assigned when a directory is created, a source texture is stored or a complex texture is formed with a transformation procedure.

Figure 12:
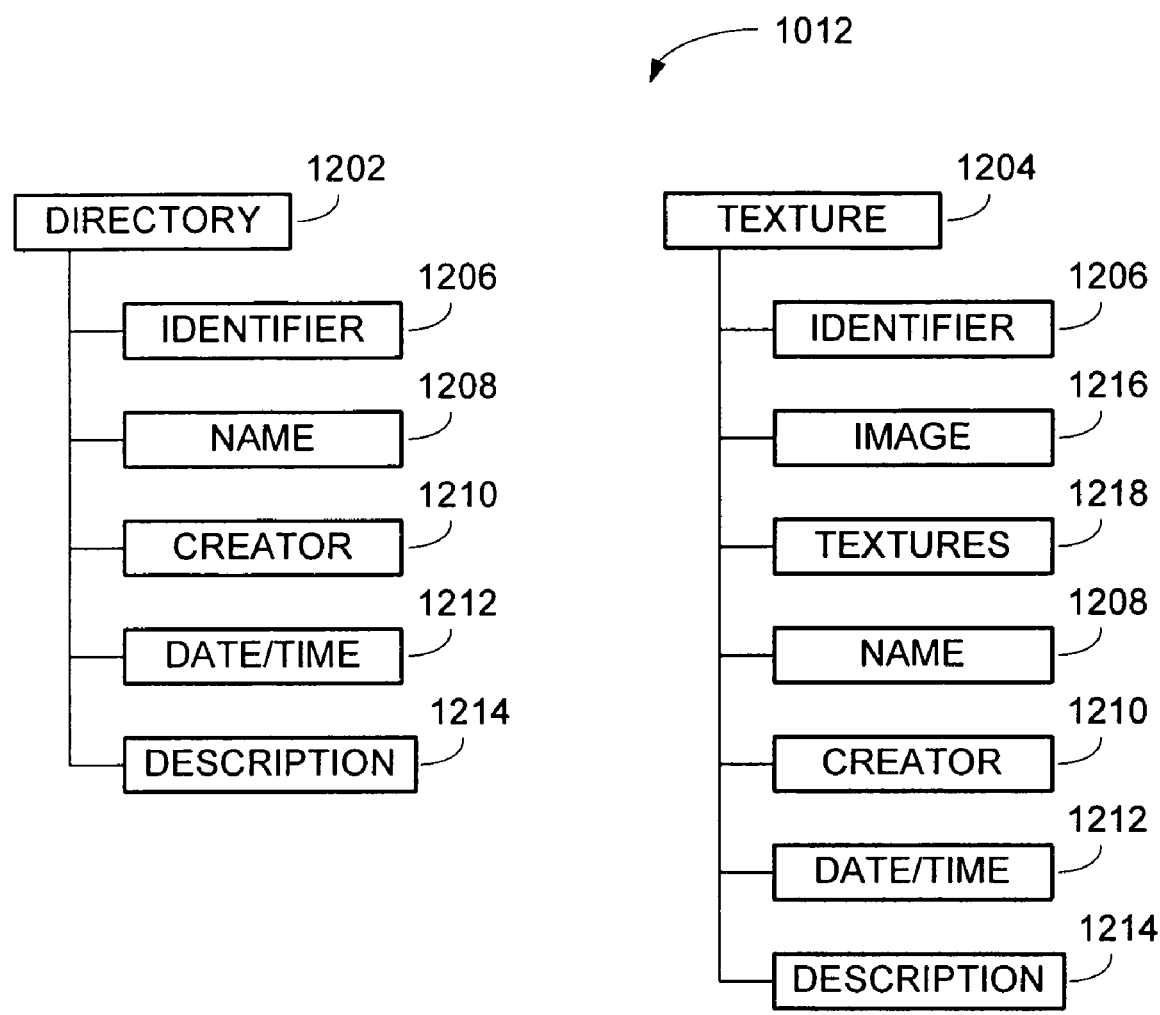
FIG. 12 is a directory that may be included with the texturizing module of FIG. 10.

FIG. 12 is a texture directory 1012. The texture directory 1012 includes at least one unique directory 1202 and at least one unique texture 1204. The directory 1202 includes attributes in the form of an identifier field 1206, a name field 1208, a creator field 1210, a date/time field 1212 and a description field 1214. In other examples greater or fewer numbers of fields of any type may be included in the directory 1202 to enable description and administration of the texture directory 1012.

The identifier field 1206 may include the unique directory identifier in the form of numbers and/or letters in a unique configuration. The unique directory identifier may be generated when the directory is created. The directory identifier uniquely identifies the directory 1202 and does not change. The name field 1208 may be a term that is descriptive of the directory 1202 such as, "roof tops." The creator field 1210 may include the name of the user who created the directory. The date/time field 1212 may include the date and time when the directory 1202 was created. The description field 1214 may briefly describe the contents of the directory 1202.

The texture 1204 may also include attributes to allow identification and administration of the textures. In the illustrated example, the texture 1204 includes an identifier field 1206, a name field 1208, a creator field 1210, a date/time field 1212 and a description field 1214 that are similar to the directory 1202, but are related to a texture instead of a directory. The texture 1204 may also include an image field 1216 and a textures field 1218. In other examples, fewer or greater numbers and types of fields may be included.

Within the image field 1216 the name of an image file, such as a bitmap file (*.bmp) may be identified. The identified image file may be a source texture for an object. The image file may be the unique texture 1204 associated with the unique texture identifier in the identifier field 1206. Alternatively, the image field 1216 may be blank and the textures field 1218 may include a unique identifier of a transformation procedure in the complex texture category that invokes transformation of one or more source textures to form one or more complex textures.

An example texture directory 1012 (FIG. 10) may include a root directory of the library component 1004 that has the unique directory identifier 00000000 (unsigned long zero). Other directories 1202 and textures 1204 may be formed under the texture directory 1012. An example of a small library is illustrated in Table 1.

TABLE 1

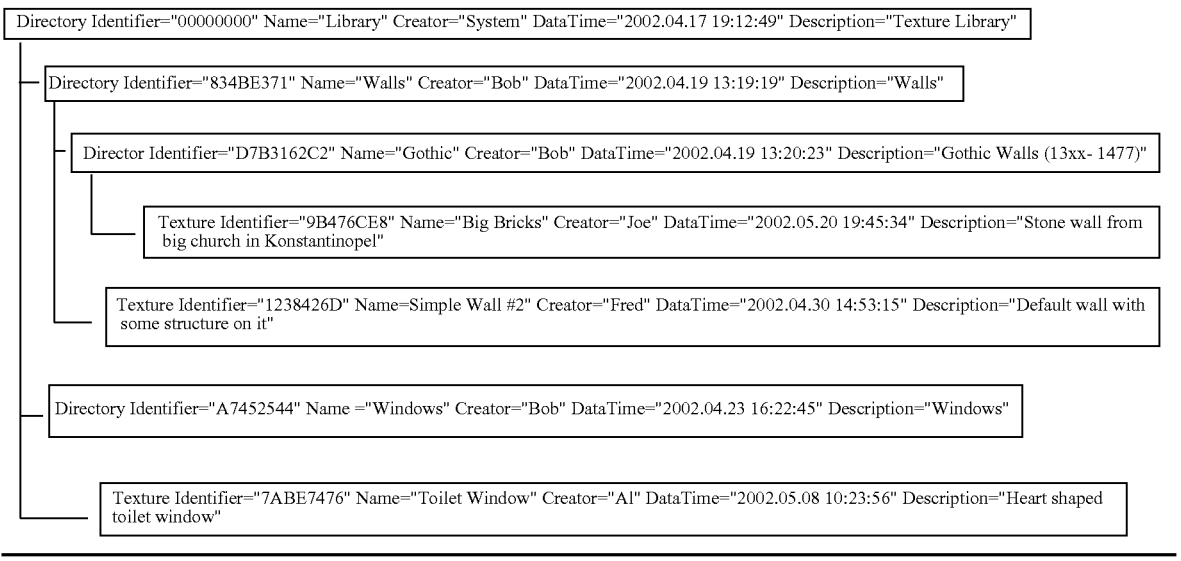

In FIG. 10, the graphical user interface (GUI) component 1006 may include a texture selection component 1014, a source texture operations component 1016 and a complex texture composition component 1018. The GUI component 1006 may be implemented using software such as Windows® API, Microsoft® Foundation Classes, KDE from Linux, Zinc™ from WindRiver® or any other GUI related software. In other examples, additional or fewer components may be included to illustrate the functionality of the GUI component 1006.

The texture selection component 1014 may include instructions to select textures. For example, selection may involve extracting textures from, or inserting textures into, the library component 1004. Selection of textures may be performed with a selection screen. The selection screen may provide capability to select textures based on selecting from the tree structure of the texture directory 1012. In addition, the selection screen may provide the capability to select textures based on a search, such as a Boolean search, of one or more of the previously discussed texture attributes. The texture attributes search engine may be part of the texture selection component 1014.

Figure 13:
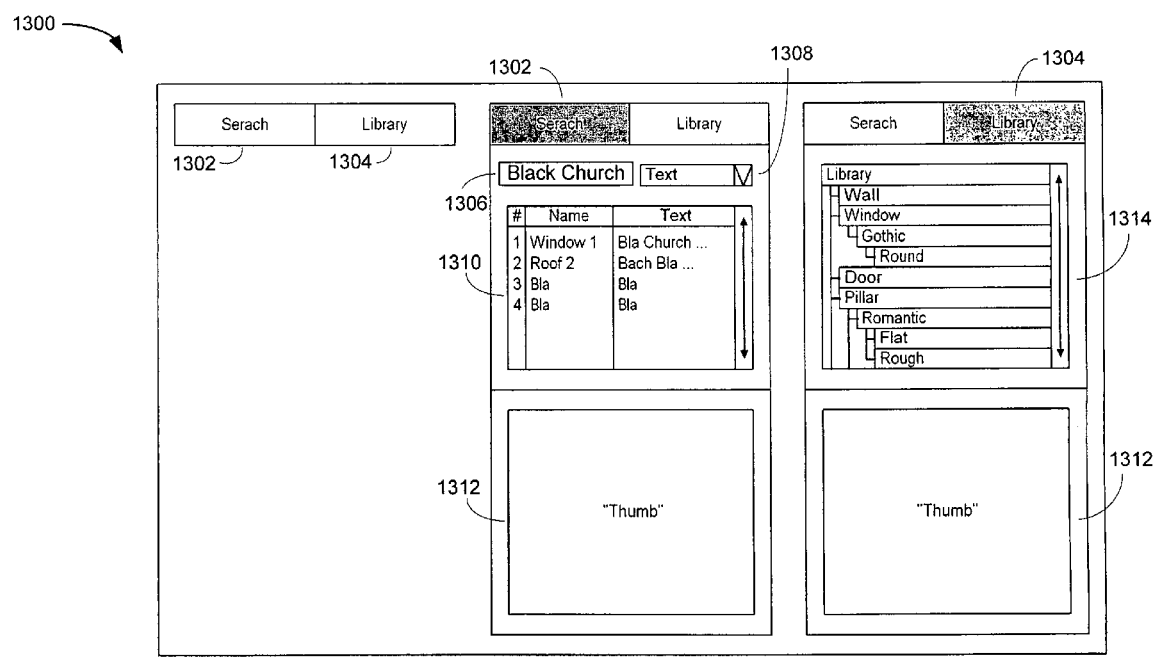
FIG. 13 is a display generated with the texturizing module of FIG. 10.

FIG. 13 illustrates an example of the selection display 1300. The selection display 1300 includes a first mode that is a search mode 1302 and a second mode that is a library mode 1304. When the search mode 1302 is selected, a user may enter one or more search terms in a search term entry 1306 and select one or more fields of search from a pull down menu that is a search field selector 1308. The search results may be displayed in a results window 1310. In the illustrated example, a "text" type search with the search term "black church" provided two textures in the results window 1310 named: "Window 1" and "Roof 2," along with the associated text identified during the search. Upon selection of one of the textures from the results window 1310, a small scale image of the texture may be displayed in a thumb view 1312. From the thumb view 1312, the selected texture may be for example, dragged and dropped or double clicked to add to a complex texture.

When the library selection 1304 is selected, the tree structure of the textures within the texture directory 1012 (FIG. 10) may be displayed in a tree structure window 1314. A user may scroll, as well as open and close, parts of the tree structure within the tree structure window 1314. By selecting one of the textures from the tree structure window 1314, a small scale image of the texture may be displayed in the thumb view 1312.

Also in FIG. 10, the source texture operations component 1016 may provide instructions that allow for the display and configuration of the transformation of source textures to build complex textures. More specifically, the source texture operations component 1016 may perform clipping, colorizing, rotating and mirroring of source textures. Preparation of this portion of the transformation procedure may be created using a source texture manipulation display.

Figure 14:
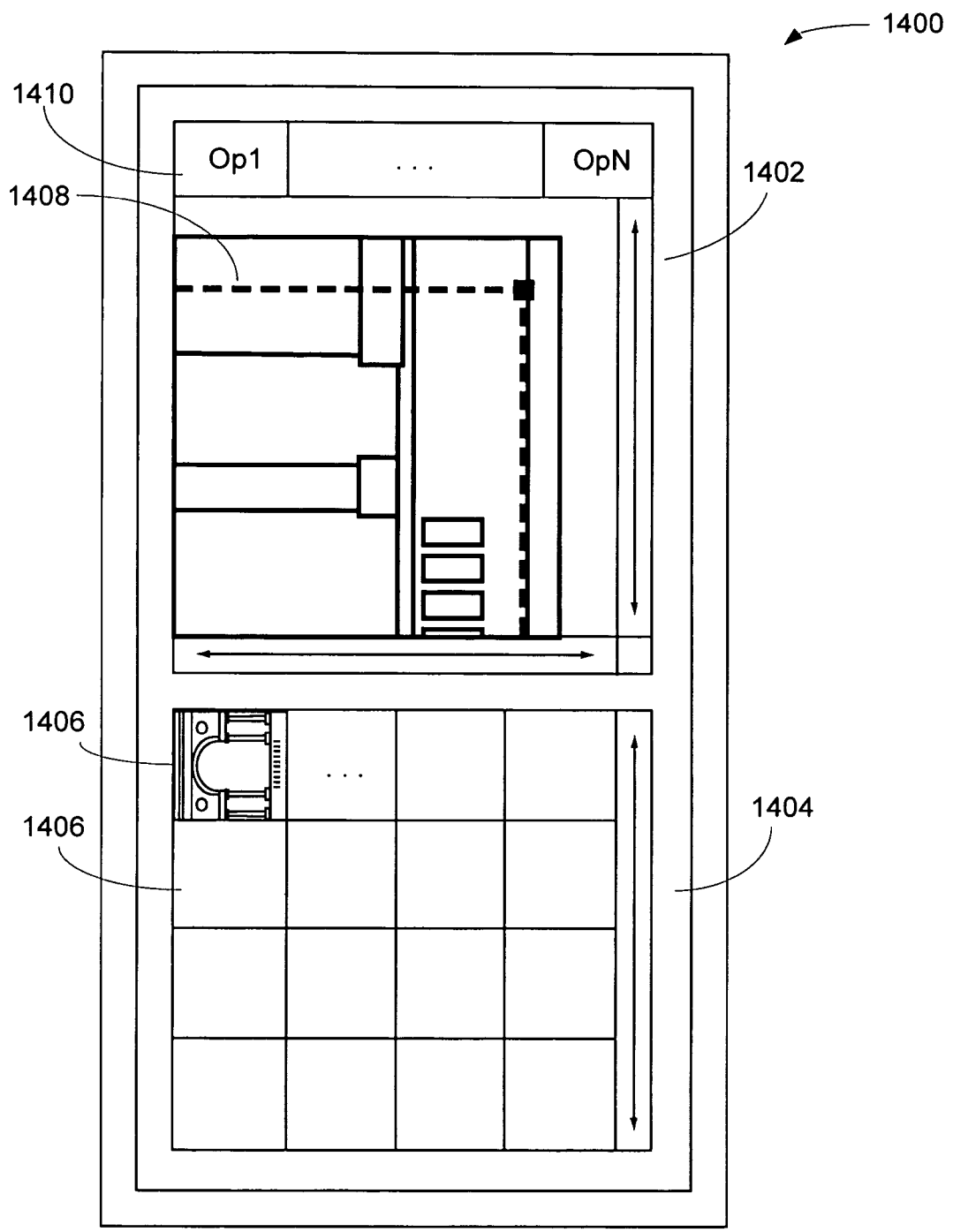
FIG. 14 is a second display generated with the texturizing module of FIG. 10.

FIG. 14 is an example source texture manipulation display 1400. The source texture manipulation display 1400 includes a work space 1402 and a source texture selection space 1404. The work space 1402 may display a source texture selected from the source texture selection space 1404. The source texture selection space 1404 may display one or more images of different source textures each in a thumb view 1406. The source textures displayed in the source texture selection space 1404 may be source textures selected with the texture selection component 1014 (FIG. 10).

The currently selected source texture that is shown in the work space 1402 may be manipulated to perform transformation of the source texture. Manipulation may include setting up a clipping rectangle 1408 with respect to the selected source texture. The entire source texture or a selected portion of the source texture may be enlarged (e.g., zoomed) and scrolled within the work space 1402 to allow the user to precisely set up the clipping rectangle 1408. The clipping rectangle 1408 may be used to perform clipping, rotation and mirroring operations of the source texture within the work space 1402. Textures displayed in the thumbs views 1406 in the source texture selection space 1404 may be moved to the work space 1402 by a drag and drop operation or double clicking selection using a relative or absolute pointing device.

The work space 1402 may also include a tool bar 1410. The tool bar 1410 may include selector buttons (identified as OP1 to OPn) for performing transformation of the source texture. The selector buttons may be designated for the various manipulative operations that may be performed during transformation of the source texture. For example, selector buttons may be designated to support the operations of clipping, colorizing, rotating and mirroring of source textures. In other examples, other forms of easy access commands to invoke various manipulative functions within the work space 1402, such as particular keyboard entries or voice commands, may be employed.

Each transformation operation performed on a source texture may be captured and stored by the source texture operations component 1016 as part of a source transformation procedure. The source transformation procedure for each source texture may be associated with the transformed source texture. Accordingly, when the transformed source texture is used to form a complex texture, the associated source transformation procedure may be made part of the transformation procedure used to form the complex texture.

The source transformation procedure may be a set of executable instructions. The unique ID of the source texture(s) may be included in the source transformation procedure. Thus, the source transformation procedure and not the transformed image may be stored and accessed to generate the transformed image. The processor 626 may recreate the image by executing the instructions in the source transformation procedure.

Also in FIG. 10, the complex texture composition component 1018 may provide instructions allowing a user to form a complex texture from one or more source textures. A complex texture may be formed by transforming one or more of the source textures. Formation of a complex texture may be accomplished with a complex texture formation display.

Figure 15:
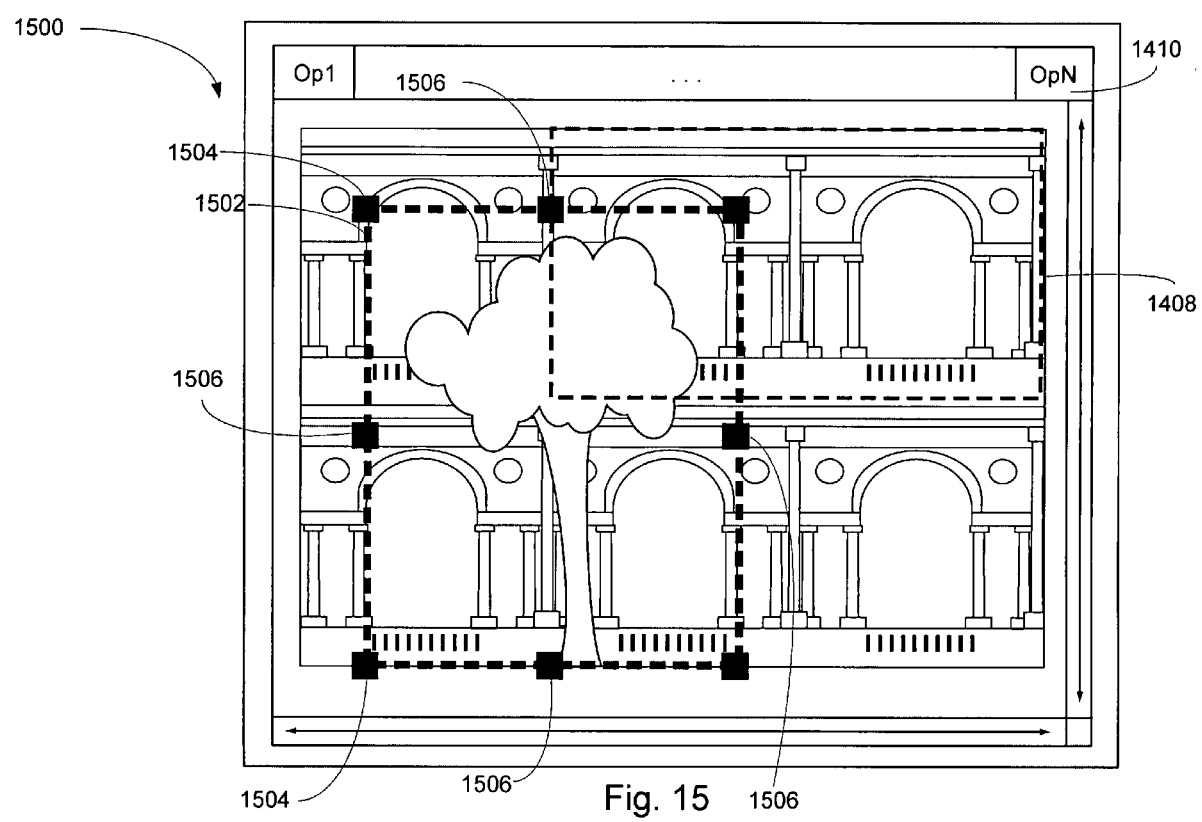
FIG. 15 is a third display generated with the texturizing module of FIG. 10.

FIG. 15 is an example of a complex texture formation display 1500. A complex texture is depicted in the example complex texture formation display 1500. The entire complex texture or a selected portion may be zoomed and scrolled with the complex texture composition component 1018 (FIG. 10). In addition, instructions in the complex texture composition component 1018 may be initiated through select and arrange one or more source textures to form the complex texture. Selection and arrangement of the source textures may involve transformation of the source textures. Source textures that have been transformed may also be locked/unlocked with instructions executed in the complex texture formation display 1500. The source textures that have been transformed to a desired state may be locked to avoid accidental changes.

Instructions within the complex texture composition component 1018 (FIG. 10), may support the repeating, scaling, positioning and ordering transformations of source textures. The complex texture composition component 1018 may also capture and store each of the transformation operations as part of a complex transformation procedure. The complex transformation procedure may similarly include unique texture identifiers of the source textures and instructions to perform the transformation of the source texture. Alternatively, the complex transformation procedure may be associated with the complex texture by appending the source transformation procedure(s) (if any) associated with the source textures. In yet another alternative, the complex transformation procedure may be associated with the complex texture as an additional transformation procedure.

Performing transformations with the complex texture composition component 1018 (FIG. 10) may include editing the complex texture using the clipping rectangle 1408 (FIG. 14) and/or a source texture bounding rectangle 1502. The source texture bounding rectangle 1502 may be used to perform scaling and positioning transformations as well as to create corresponding complex transformation procedures. Included with the example source texture bounding rectangle 1502 illustrated are corner points 1504 and center points 1506. Horizontal and vertical lines extend between the corner points 1504 and the center points 1506 to define the size of the source bounding rectangle 1502. The corner points 1504 and the center points 1506 may be used to adjust the size of the source bounding rectangle 1502 by clicking and dragging the corner points 1504 or the center points 1506. The source bounding rectangle 1502 may also automate the process of manipulating adjacently located textures to be in contact with each other.

The transformation procedures of repeat and ordering may also be performed by the complex texture composition component 1018 (FIG. 10). The repeat transformation procedure may be controlled by selector buttons of the tool bar 1410 or some other functionality associated with the complex texture formation display 1500. A gap size between the repeated source textures may also be altered with the complex texture composition component 1018. In addition, the ordering transformation procedures that indicate which source texture is drawn first may also be set/altered with the complex texture composition component 1018.

The complex texture may be further supported by under laying a background image, such as a photograph taken with a digital camera or other image capturing devices. The background image may be shown in the background without mixing with the complex texture. For example, an image of the front side of an adjacently located building may be added to the background of a complex texture that represents a building being scanned. The background image may similarly be scaled and positioned relative to the complex texture. In addition, a complex transformation procedure may be created for the background image.

Upon completion of the complex texture, the source transformation procedure(s) and the complex transformation procedure may be combined to form one transformation procedure. The transformation procedure may include unique texture identifiers for all the source textures used to form the complex texture. In addition, the transformation procedure may include logic instructions to selectively manipulate the source textures to form complex textures. Accordingly, instead of storing the actual complex texture as an image file, the corresponding transformation procedure(s) may be assigned a unique texture identifier and categorized in the texture directory 1012. (FIG. 10)

Figure 16:
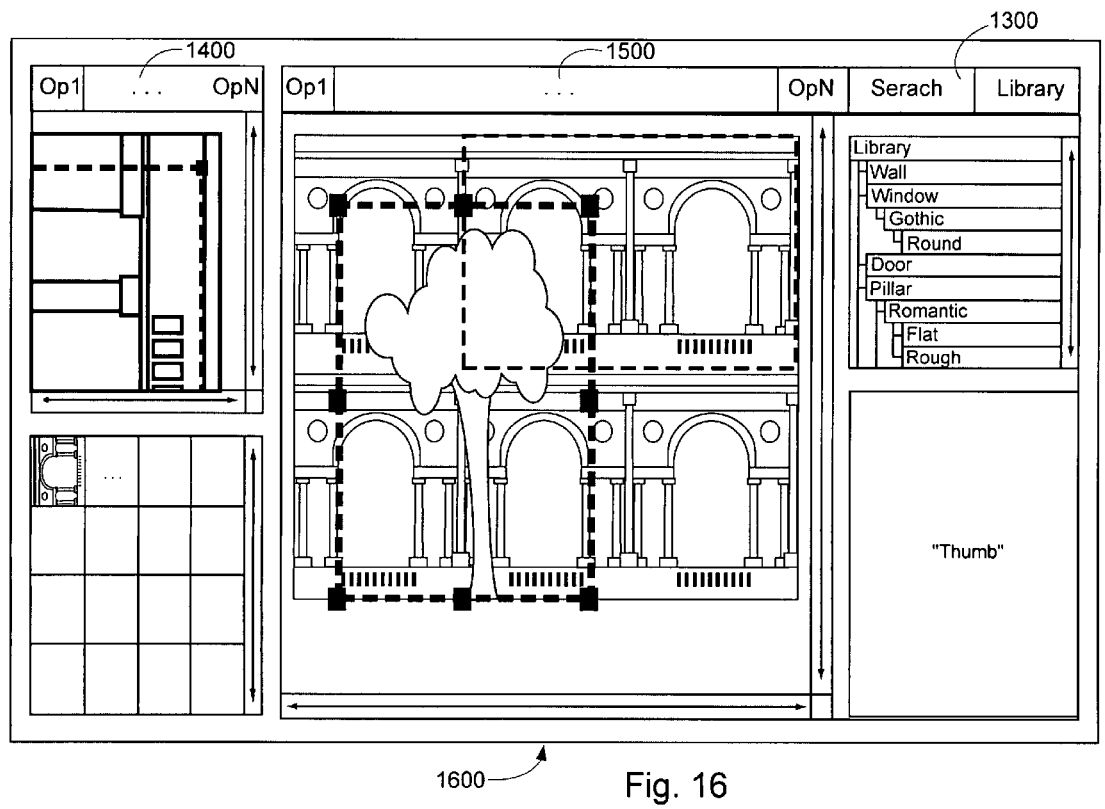
FIG. 16 is a fourth display generated with the texturizing module of FIG. 10.

FIG. 16 is an example texture maker display 1600 that includes the selection display 1300, the source texture manipulation display 1400 and the complex texture formation display 1500. Accordingly, source textures may be identified, transformed and manipulated to form complex textures using a single display. In other examples, the texture maker display 1600 may be arranged differently or may have some other combination of the previously discussed displays.

In addition to the previously discussed texture related operations, additional functionality may also be available from instructions in the texturizing module 634 (FIG. 6). The additional functionality may be available from a display menu or other user interfaces. Such functionality may include the capability to create new complex textures. The creation of a new complex texture may include selecting properties for the texture such as the size, transformation procedures and any other texture related information. In addition, a new source texture may be created from a copy of an existing complex texture utilizing some or all of the associated properties of the existing complex texture. Following execution of transformation procedures to create the complex texture in the form of an image, the image may be stored as a source texture.

Functionality within the texturizing module 634 may also include a capability to edit the size, transformation procedures and/or any other information associated with a texture. Other information may include, for example, the information in the previously discussed layers of the three-dimensional electronic model. The texture size and other properties may be edited at any time. Additional functionality may include the capability to perform saving/loading operations, preference selection capability, tool tips and a help menu.

The texturizing module 634 may also include instructions to support synchronization of the textures and the library structure within a client server architecture. The texturizing module 634 may operate on a server computer and also on any number of client computers. The server may be accessible by users with one of the client computers.

The textures and library structure may be maintained by instructions in the library component 1004 (FIG. 10) using any technique to avoid the creation of multiple versions of a texture or library structure. Multiple versions may be created when a texture or library structure is modified in parallel by two users. An example technique to avoid multiple versions involves a single user process. With the single user process, when one or more textures and/or portion of the library structure is being modified by one user, instructions in the library component 1004 may deny other users access to those one or more textures and/or portions of the library until the single user finishes the modifications.

Alternatively, a synchronization process may be implemented. Synchronization of the work of various users within the texturizing module 634 may be coordinated by instructions in the library component 1004. As multiple users create and use textures, the users may be synchronized with each other via the server.

The work of each user may be stored locally in a local texture library on the user's client computer using instructions in the library module 1004 (FIG. 10). The server may also include the library module 1004 with capability to store the work of all users in a master texture library. The user/client may use the client computer to connect to the server and both libraries (master and local) may be synchronized. The user may then disconnect from the server. Thus, there is no steady connection. As used herein, the term "connection" refers to the client establishing communication with the server over a medium such as a network, using a TCP/IP protocol through a publicly accessible network, such as the Internet and/or a LAN with a login procedure (such as a user password schema). The parameters for forming the connection may be part of a preference menu.

During the synchronization process the unique identifier associated with each directory and texture and the date/time may be used. The unique identifier may be used to detect which parts of the texture directory are the same in the local library and the master library. In addition, the date/time may be used to determine which texture and/or directory is newer.

The master and local library may both include the information provided in Table 2.

TABLE 2

- Directory Identifier="00000000" Name="Library" Creator="System" DataTime="2002.04.17 19:12:49" Description="Texture Library"
  - Directory Identifier="834BE371" Name="Walls" Creator="Bob" DataTime="2002.04.19 13:19:19" Description="Walls"
    - Director Identifier="D7B3162C2" Name="Gothic" Creator="Bob" DataTime="2002.04.19 13:20:23" Description="Gothic Walls (13xx- 1477)"
      - Texture Identifier="9B476CE8" Name="Big Bricks" Creator="Joe" DataTime="2002.05.20 19:45:34" Description="Stone wall from big church in Konstantinopel"
      - Texture Identifier="1238426D" Name=Simple Wall #2" Creator="Fred" DataTime="2002.04.30 14:53:15" Description="Default wall with some structure on it"
  - Directory Identifier="A7452544" Name ="Windows" Creator="Bob" DataTime="2002.04.23 16:22;45" Description="Windows"
    - Texture Identifier="7ABE7476" Name="Toilet Window" Creator="Al" DataTime="2002.05.08 10:23:56" Description="Heart shaped toilet window"

A first user then performs modifications to the local library. The modifications include creating a new texture with unique identifier "8E1BC531", changing the directory location of an existing texture uniquely identified as "1238426D" and changing the description of another existing texture uniquely identified as "9B476CE8" as depicted in Table 3.

TABLE 3

- Directory Identifier="00000000" Name="Library" Creator="System" DataTime="2002.04.17 19:12:49" Description="Texture Library"
  - Directory Identifier="834BE371" Name="Walls" Creator="Bob" DataTime="2002.04.19 13:19:19" Description="Walls"
    - Director Identifier="D7B3162C2" Name="Gothic" Creator="Bob" DataTime="2002.04.19 13:20:23" Description="Gothic Walls (13xx- 1477)"
      - Texture Identifier="9B476CE8" Name="Big Bricks" Creator="Bob" DataTime="2002.05.22 18:13:55" Description="Stone wall from big church in Rom"
      - Texture Identifier="1238426D" Name=Simple Wall #2" Creator="Bob" DataTime="2002.05.22 18:17:22" Description="Default wall with some structure on it"
  - Directory Identifier="A7452544" Name ="Windows" Creator="Bob" DataTime="2002.04.23 16:22:45" Description="Windows"
    - Texture Identifier="7ABE7476" Name="Toilet Window" Creator="Al" DataTime="2002.05.08 10:23:56" Description="Heart shaped toilet window"
    - Texture Identifier="8E1BC531" Name="Roof Window" Creator="Bob" DataTime="2002.05.09 09:48:37" Description="Roof window of San Martin Church"

Meanwhile, the master library has been updated by a second user. The second user updated the texture directory with a new texture uniquely identified as "175FC4EA" and also modified the texture identified as "9B476CE8" as illustrated in Table 4. The modifications to the texture identified as "9B476CE8" do not include changes to the description but rather the directory location and the composition of the texture.

TABLE 4

- Directory Identifier="00000000" Name="Library" Creator="System" DataTime="2002.04.17 19:12:49" Description="Texture Library"
  - Directory Identifier="834BE371" Name="Walls" Creator="Bob" DataTime="2002.04.19 13:19:19" Description="Walls"
    - Director Identifier="D7B3162C2" Name="Gothic" Creator="Bob" DataTime="2002.04.19 13:20:23" Description="Gothic Walls (13xx- 1477)"
      - Texture Identifier="175FC4EA" Name="Small Bricks" Creator="Fred" DataTime="2002.05.21 15:48:42" Description="Oracle from Delphi wall"
    - Texture Identifier="9B476CE8" Name="Big Bricks" Creator="Fred" DataTime="2002.05.21 15:52:17" Description="Stone wall from big church in Konstantinopel"
      - Texture Identifier="1238426D" Name=Simple Wall #2" Creator="Fred" DataTime="2002.04.30 14:53:15" Description="Default wall with some structure on it"
  - Directory Identifier="A7452544" Name ="Windows" Creator="Bob" DataTime="2002.04.23 16:22:45" Description="Windows"
    - Texture Identifier="7ABE7476" Name="Toilet Window" Creator="Al" DataTime="2002.05.08 10:23:56" Description="Heart shaped toilet window"

When the first user forms a connection with the server and synchronizes the local library of the first user with the master library, the resulting changes in the master library are illustrated in Table 5. Specifically, the newly created texture identified as "8E1BC531" is added at the specified directory location. In addition, the texture identified as "1238426D" is moved to the specified directory location. Further, the texture identified as "9B476CE8" (the texture changed by both the first and second users) is placed at the directory location specified by the second user. Texture "9B476CE8" includes the change in composition of the texture performed by the first user, and the new description changed by the second user. Thus, the texture identified as "9B476CE8" is a mix of both updates.

first user may then select the correct attribute. Alternatively, the first user may abort the synchronization process and take some other action, such as duplicate the texture identified as "9B476CE8" and provide another unique texture identifier. Similar actions may be performed regarding directories. In the case of inconsistent directories, however, only the texture name, description and the directory location may be the basis for inconsistencies.

To assure the uniqueness of the identifier for each texture, the server may allocate each user a group of unused identifiers during the synchronization process. The group may include a determined number of unique identifiers. The determined number of unique identifiers may be based on the memory

TABLE 5

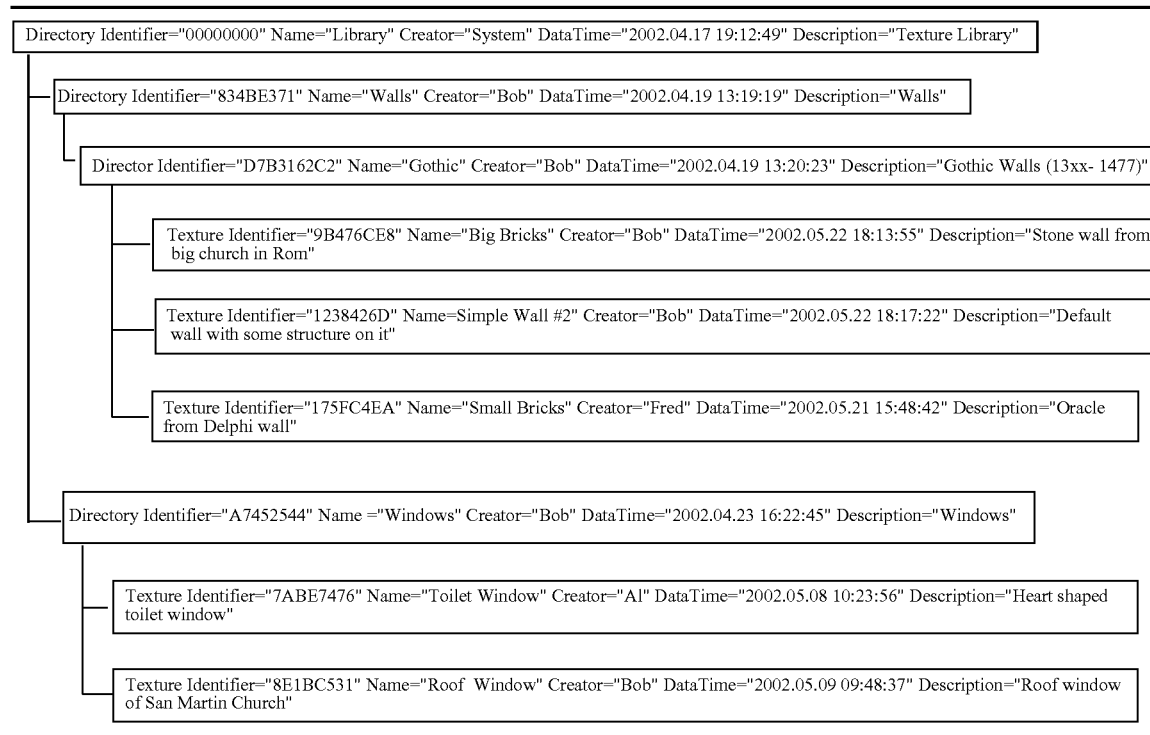

The updates by multiple users to the texture identified as "9B476CE8" may be performed automatically by the texturizing module 634. Alternatively, when the synchronization process occurs, the texturizing module 634 may determine that the version modified by the first user is more current. In addition, the texturizing module 634 may determine that the directory location and composition of the texture in the version modified by the first user are different. Further, the texturizing module 634 may determine that the first user did not change the directory location and composition in the version modified by the first user. Based on the determined conditions, the texturizing module 634 may set an inconsistency flag for each of the inconsistent attributes (texture, name and directory location) associated with the texture identified as "9B476CE8." In addition, the texturizing module 634 may generate a dialog box(es) requesting instruction from the first user.

The dialog box may show the inconsistent attributes and request the first user to decide which attribute should remain associated with the texture identified as "9B476CE8." The allocated to store the data. If the address space of the identifiers is 32 bits for example, the size of the group may be 1024 bits or more.

Instructions within the texturizing module 634 operating on the server may include network communication capability and server administrator functionality. Communication capability may involve the server "listening" on a specific TCP/IP port waiting for a user operating a client computer to connect over the network. The server may run in the background and may have an icon in a system tray. By entering a command, such as by double clicking the icon, an administrator of the server may get a configuration dialog box with capability to create a new library, perform loads/saves/backups, import and/or export textures, select parameters related to the network communication and manage user names and passwords. The server may also export a group of unique identifiers in an identifier group file. The identifier group file may be imported by a user using a client computer with no network access to provide unique identifiers for textures created by that user within the local library of the client computer.

Figure 17:
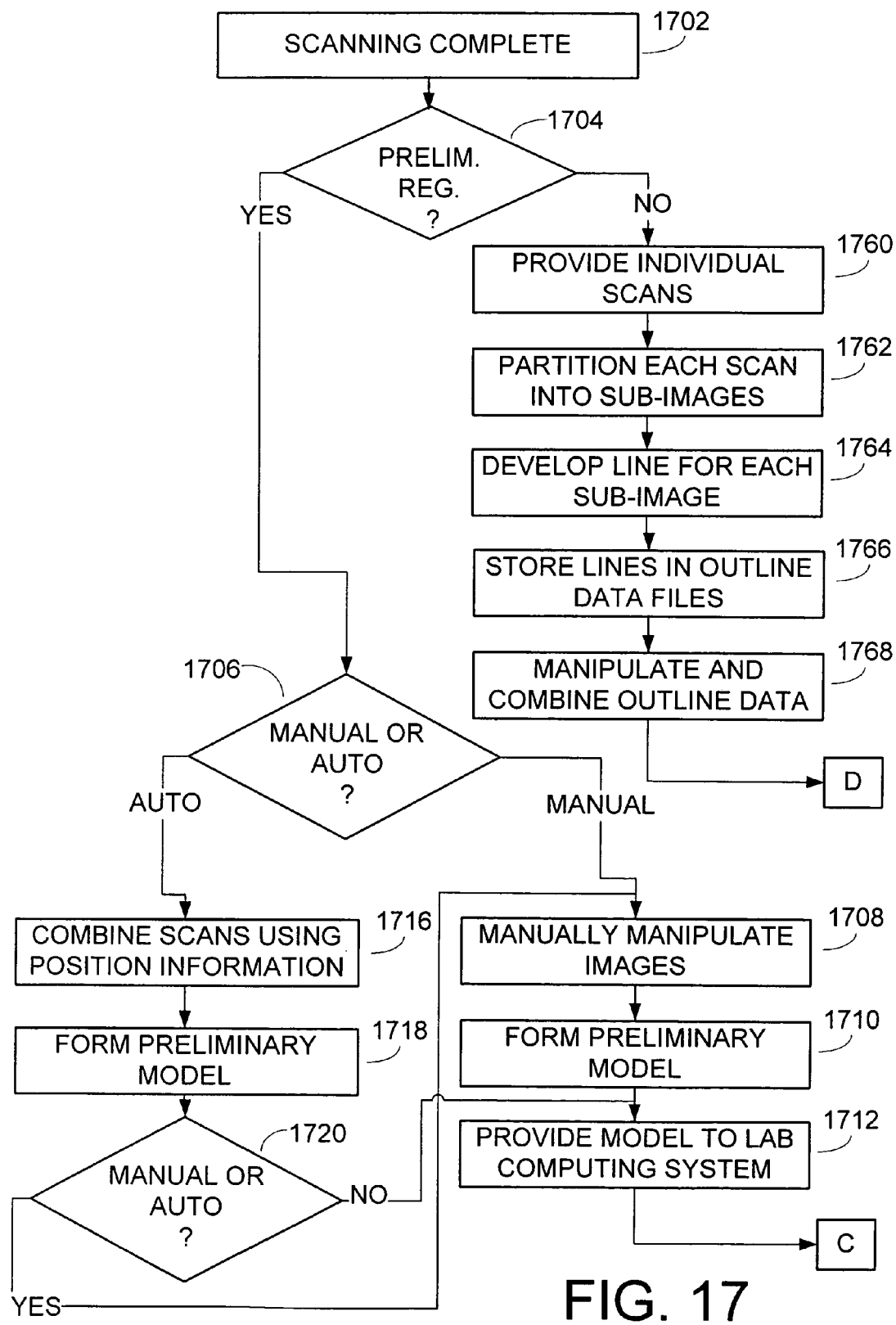
FIG. 17 is a partial flow diagram of a computing method.

FIG. 17 is a partial flow diagram illustrating the processing of three-dimensional electronic images to form a three-dimensional electronic model by the image generation system 100 illustrated in FIGS. 1 and 6. The operation begins at block 1702 when the scanning of an object is complete and the scan information (three-dimensional electronic images, associated position information, etc.) has been stored in the memory module 604 of the site computing system 106. At block 1704 it is determined if the site computing system 106 includes the preliminary registration module 610. If the site has the preliminary registration module, the user may select manual or automatic manipulation to combine the scans at block 1706. If a manual manipulation is selected, the user may move and rotate the three-dimensional electronic images individually while viewing the object at block 1708. At block 1710, the user may manually form a preliminary three-dimensional electronic model from the three-dimensional electronic images to match the object being viewed. When the manipulation is complete, the preliminary three-dimensional electronic model may be provided to the lab computing system 108 at block 1712.

If the automatic manipulation is selected at block 1706, instructions in the preliminary registration module 610 may be executed to use the position information to combine and manipulate the three-dimensional electronic images at block 1716. At block 1718, the preliminary three-dimensional electronic model may be formed. The user may decide whether additional manual manipulation is desired at block 1720. If manual manipulation is desired, the operation returns to block 1708. If manual manipulation is not desired, the operation proceeds to block 1712 to provide the preliminary three-dimensional electronic model to the lab computing system 108.

Figure 18:
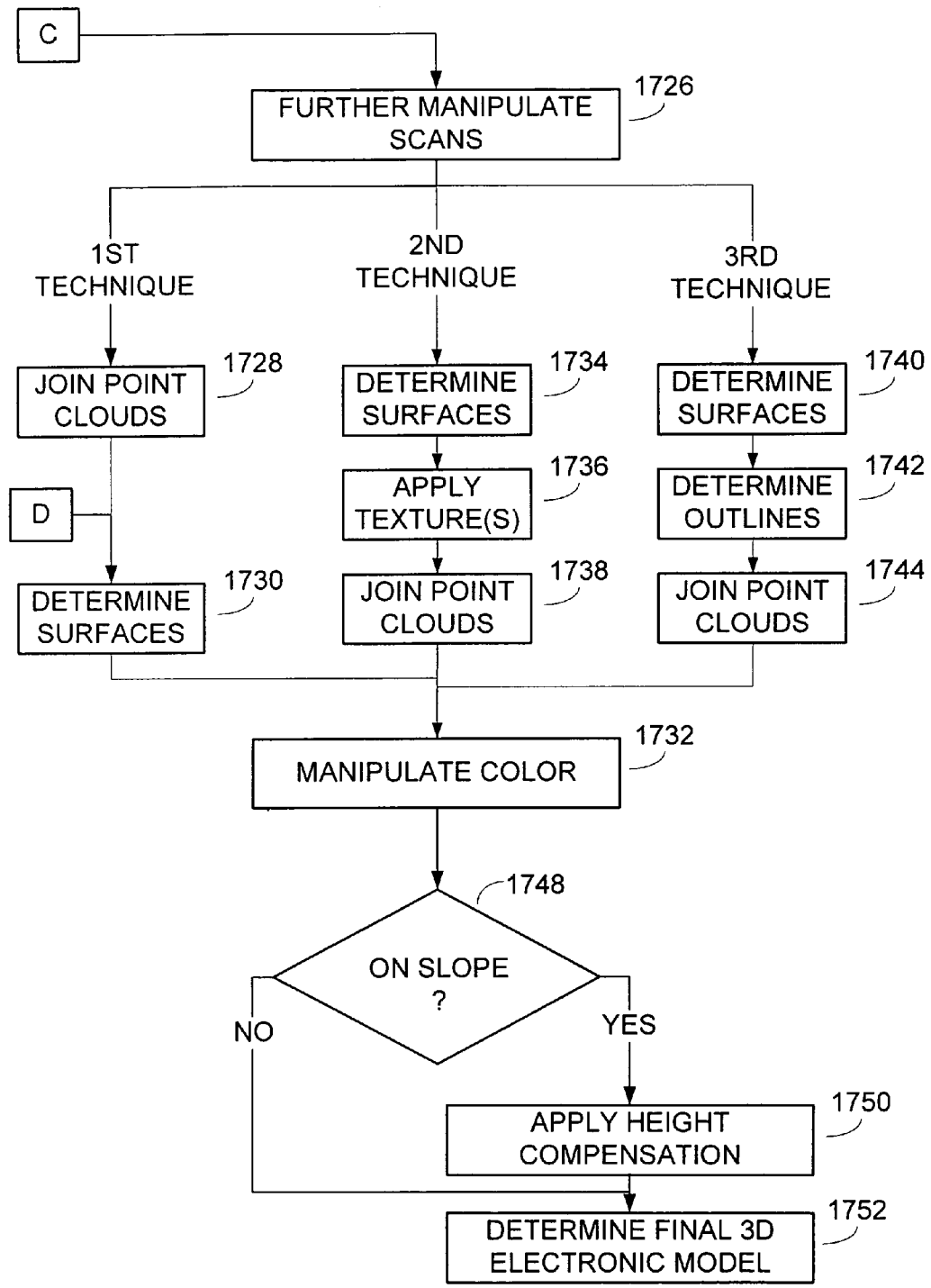
FIG. 18 is a partial flow diagram the couples the method of FIG. 17.

In FIG. 18, at block 1726, the three-dimensional electronic images that form the preliminary three-dimensional electronic model are manually and/or automatically manipulated further (precise registration) to improve the fit between the scans. When the precise registration involves the first technique, the point clouds of three-dimensional electronic images are combined to form the model point cloud by comparing the geometric points at block 1728. The model point cloud represents the three-dimensional electronic model. At block 1730, surfaces of the three-dimensional electronic model (the model point cloud) are determined. At block 1732, the color may be manipulated.

When the precise registration involves the second technique, surfaces of each of the three-dimensional electronic images (the point clouds) are determined at block 1734. At block 1736, texture is applied to the surfaces of each of three-dimensional electronic images. The three-dimensional electronic images are joined to form the three-dimensional electronic model based on the surfaces and/or the textures at block 1738. At block 1732, the color may be manipulated.

When the precise registration involves the third technique, surfaces of each of the three-dimensional electronic images are determined at block 1740. At block 1742, an outline of each surface is determined. The three-dimensional electronic images are joined to form the framework of the three-dimensional electronic model based on the outlines at block 1744. At block 1732, the color may be manipulated.

At block 1748, it is determined if the object that was scanned was set on a sloped resting surface. If the resting surface was sloped, a height compensation is applied at block 1750. At block 1752, the final three-dimensional electronic model is determined. If the resting surface is not sloped at block 1748, the operation proceeds to block 1752 to determine the final three-dimensional electronic model.

Referring again to block 1704 of FIG. 17, where the preliminary registration module 610 is not used or is unavailable, the information from each scan is provided to the lab computing system 108 individually at block 1760. At block 1762, each of the three-dimensional electronic images represented with a point cloud are partitioned into sub-images by the scan combining module 630. A line representative of a sub-image is developed for each of the sub-images at block 1764. At block 1766, the lines are each stored in an outline data file. The outline data files are then combined and manipulated to form the three-dimensional electronic model at block 1768. The operation then returns to block 1730 of FIG. 18 to complete formation of the three-dimensional electronic model.

Figure 19:
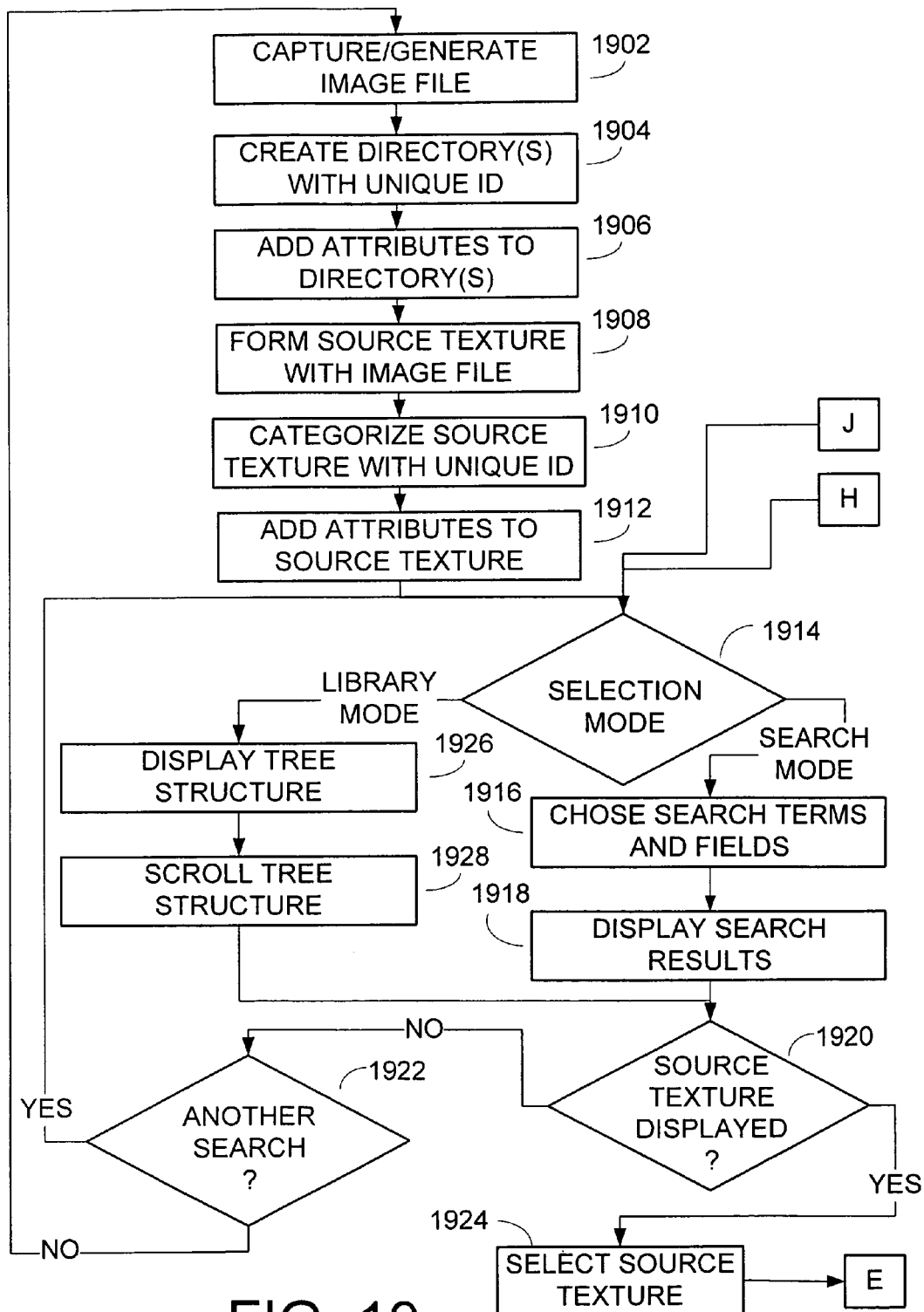
FIG. 19 is a partial flow diagram of a texturizing method.

FIG. 19 is a partial flow diagram illustrating the process to texturize a three-dimensional electronic model with the texturizing module 634 illustrated in FIGS. 6, 8 and 10. The operation begins at block 1902 where at least one image file representative of one or more textures present on the object that was scanned to create the three-dimensional electronic model is captured and/or generated. At block 1904, one or more directories are created and identified with unique identifiers within the texture directory 1012. Additional attributes are added to the directories at block 1906. At block 1908, the captured/generated image file(s) is used to form a source texture(s). Each source texture is categorized with a unique identifier in the source texture category 1008 at block 1910. At block 1912, additional attributes are added to the source texture(s).

The first mode or the second mode is used to identify and select a source texture at block 1914. If the first mode (search mode) is selected, search terms are entered and fields of search are chosen at block 1916. At block 1918, search results are displayed with the results window 1310. At block 1920 it is determined if there are source textures available within the displayed source textures that may be useable on the three-dimensional electronic model. If no source textures are available, it is determined if another search for source textures should be performed at block 1922. If no additional searching should be performed, the operation returns to block 1902 to capture and/or generate additional image file(s).

If additional searching should be performed, the operation returns to block 1914 to chose the selection mode. If there is a useable source texture displayed at block 1920, the source texture is selected from the search results for display in the thumb view 1312 at block 1924. If the second mode (library mode) is selected at block 1914, the tree structure within the texture directory 1012 is displayed in the tree structure window 1314 at block 1926. At block 1928, the user may search the tree structure, and the operation returns to block 1920 to identify one or more useable source textures from the display.

Figure 20:
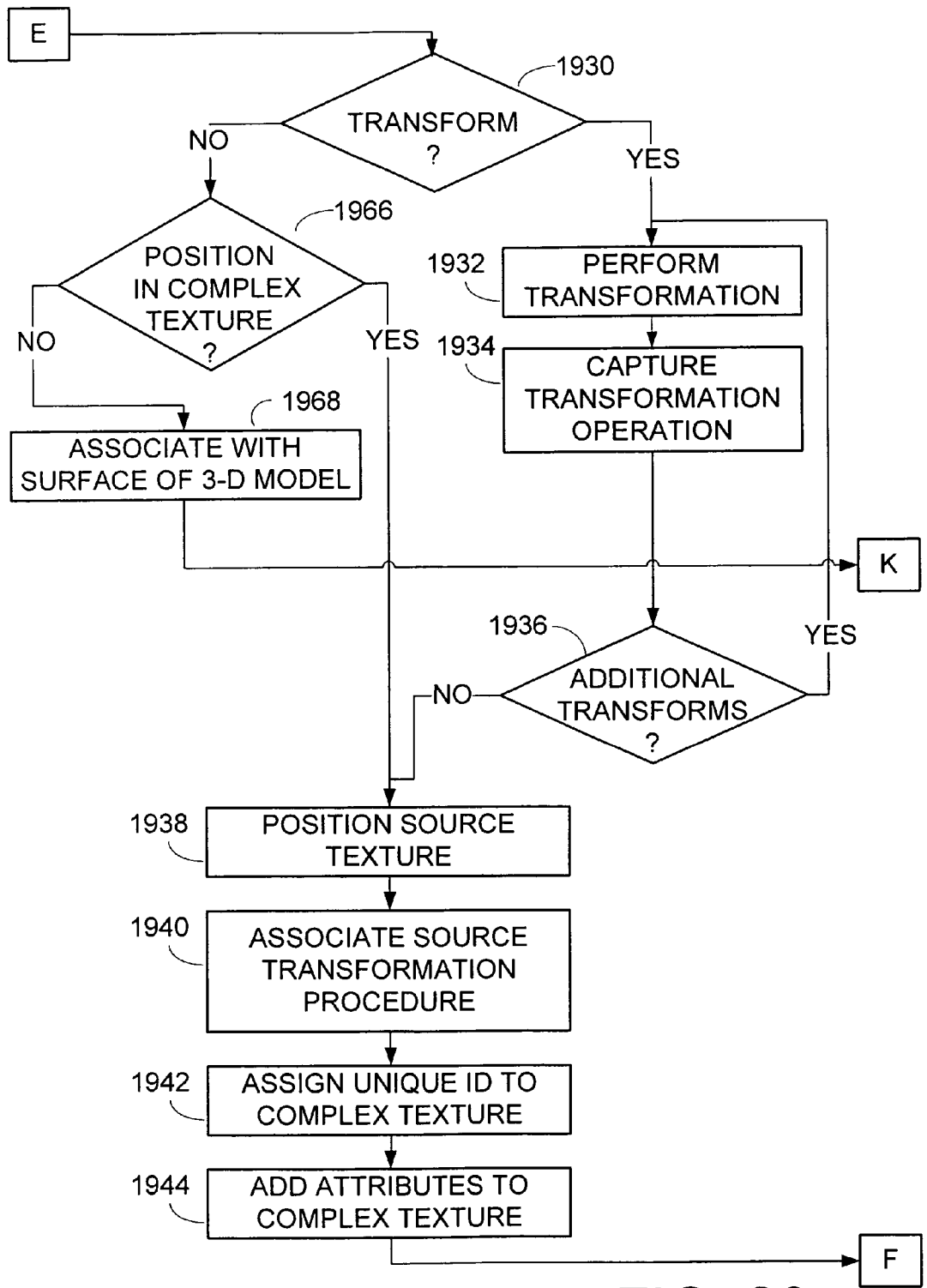
FIG. 20 is a partial flow diagram that coupes the method of FIG. 19.

In FIG. 20, it is determined whether the source texture should be transformed at block 1930. If source texture should be transformed, a transformation operation is performed on the source texture using the source texture manipulation display 1400 at block 1932. At block 1934, the transformation operation that was performed is captured and made part of a source transformation procedure. At block 1936 it is determined if additional transformation operations should be performed on the source texture. If additional transformation should be performed, the operation returns to block 1932. If no additional transformations of the source texture are desired, the transformed source texture may be positioned within the complex texture formation display 1500 to form at least part of a complex texture at block 1938. At block 1940, the source transformation procedure may be associated with the complex texture. A unique identifier may be assigned to the complex texture to categorize the complex texture in the complex texture category 1010 at block 1942. At block 1944, other attributes may be added to the complex texture.

Figure 21:
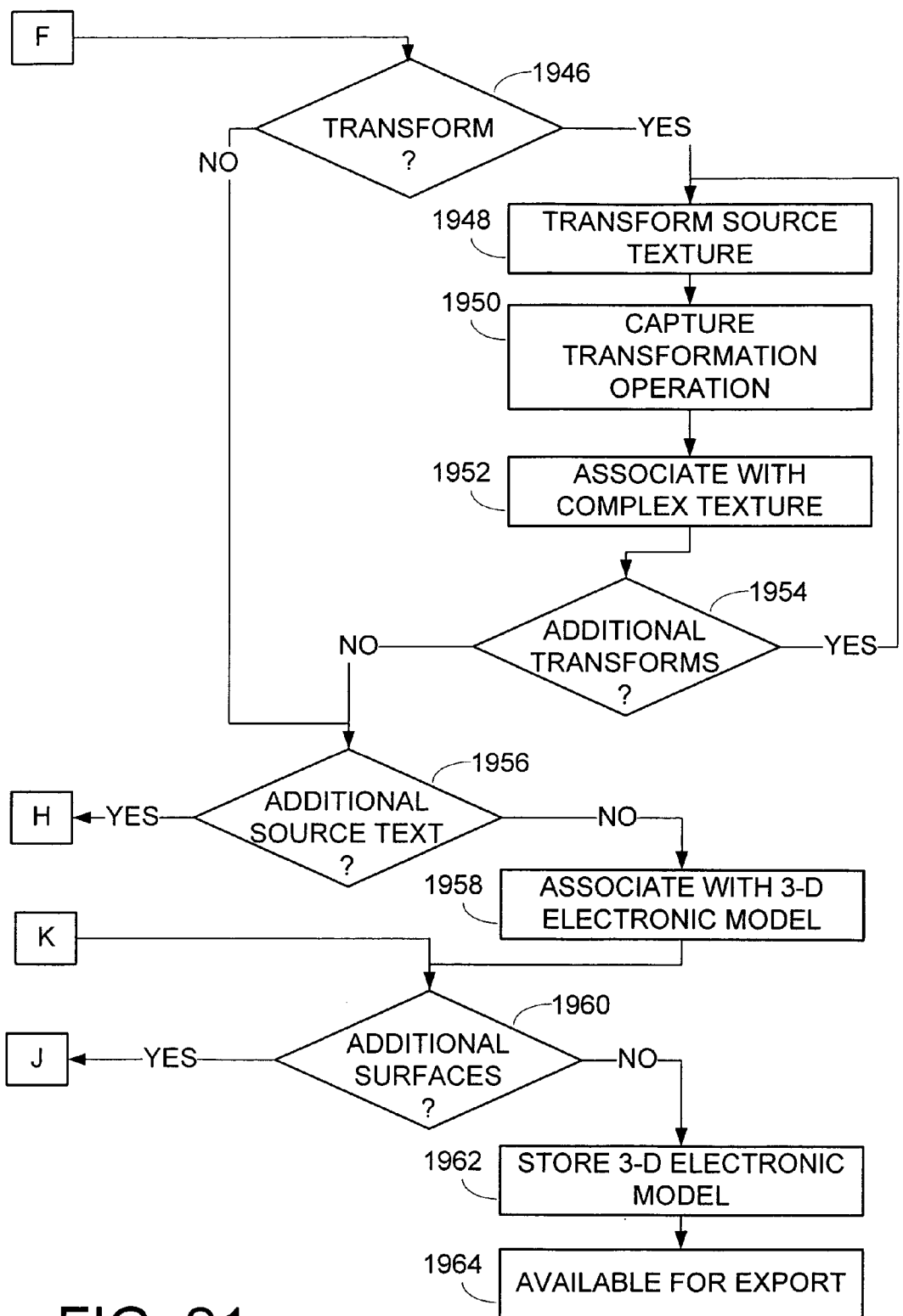
FIG. 21 is a partial flow diagram that couples the methods of FIGS. 19 and 20.

In FIG. 21, it is determined if transformations related to the transformed source texture are desired within the complex texture at block 1946. If transformations are desired, the transformed source texture is further transformed within the complex texture at block 1948. At block 1950, the transformation operation that was performed in the complex texture is captured and made part of a complex transformation procedure. The complex transformation procedure is associated with the complex texture at block 1952.

At block 1954 it is determined if additional transformation operations related to the transformed source texture should be performed within the complex texture. If additional transformation is desired, the operation returns to block 1948 to perform and capture additional transformation operations. If no additional transformations of the source texture are desired, it is determined if additional source textures are needed to form the complex texture at block 1956. If additional source textures are needed, the operation returns to block 1914 of FIG. 19 to identify and select another source texture. If no additional source textures are needed, the complex texture may be associated with one or more surfaces of the three-dimensional electronic model at block 1958.

At block 1960, it is determined if additional surfaces of the three-dimensional electronic model need to be texturized. If additional surfaces need to be texturized, the three-dimensional electronic model and associated texturization is stored at block 1962. At block 1964, the file representative of the three-dimensional electronic model is available for export. If there are additional surfaces to texturize at block 1960, the operation returns to block 1914 of FIG. 19 to select additional source textures.

If at block 1946, no transformation of the complex texture is desired, the operation proceeds to block 1956 to determine if additional source textures are needed. If at block 1930 of FIG. 20, it is desired not to transform the selected source texture, it is determined if the source texture should be positioned in a complex texture at block 1966. If the source texture should be positioned in a complex texture, the operation proceeds to block 1938. If the source texture should not be positioned in a complex texture, the source texture is associated with one or more surfaces of the three-dimensional electronic model at block 1968 and the operation proceeds to block 1960 to determine if additional surfaces need texturized.

The discussed image generation system 100 may generate an electronic representation of a three-dimensional, texturized, colored, geometric model. The three-dimensional electronic model may be almost an electronic replica of an actual object, such as one or more buildings. The object may be scanned by the image generation system 100 to create a three-dimensional electronic image. Both an electronic geometric representation and the color of the object may be collected in each of a number of scans. The scans may be combined to form a three-dimensional electronic model using position data collected during each of the scans. The geometric surfaces of the three-dimensional model may be texturized by the image generation system 100 such that viewing a display of the electronic image may be similar to physically viewing the actual object.

The scanning system 100 and scanner 104 may operate through various degrees of freedom. The scanning system 100 may be oriented horizontally, vertically, have an inclination to one or both of these axis, etc. Alternatively, the scanning system may be substantially aligned or substantially leveled in a particular orientation during multiple scans. When the scanning system 100 substantially maintains an orientation through one or more scans, variables for registering of multiple scanned data may be reduced. As a result, efficient and accurate registering may be achieved.

Figure 22:
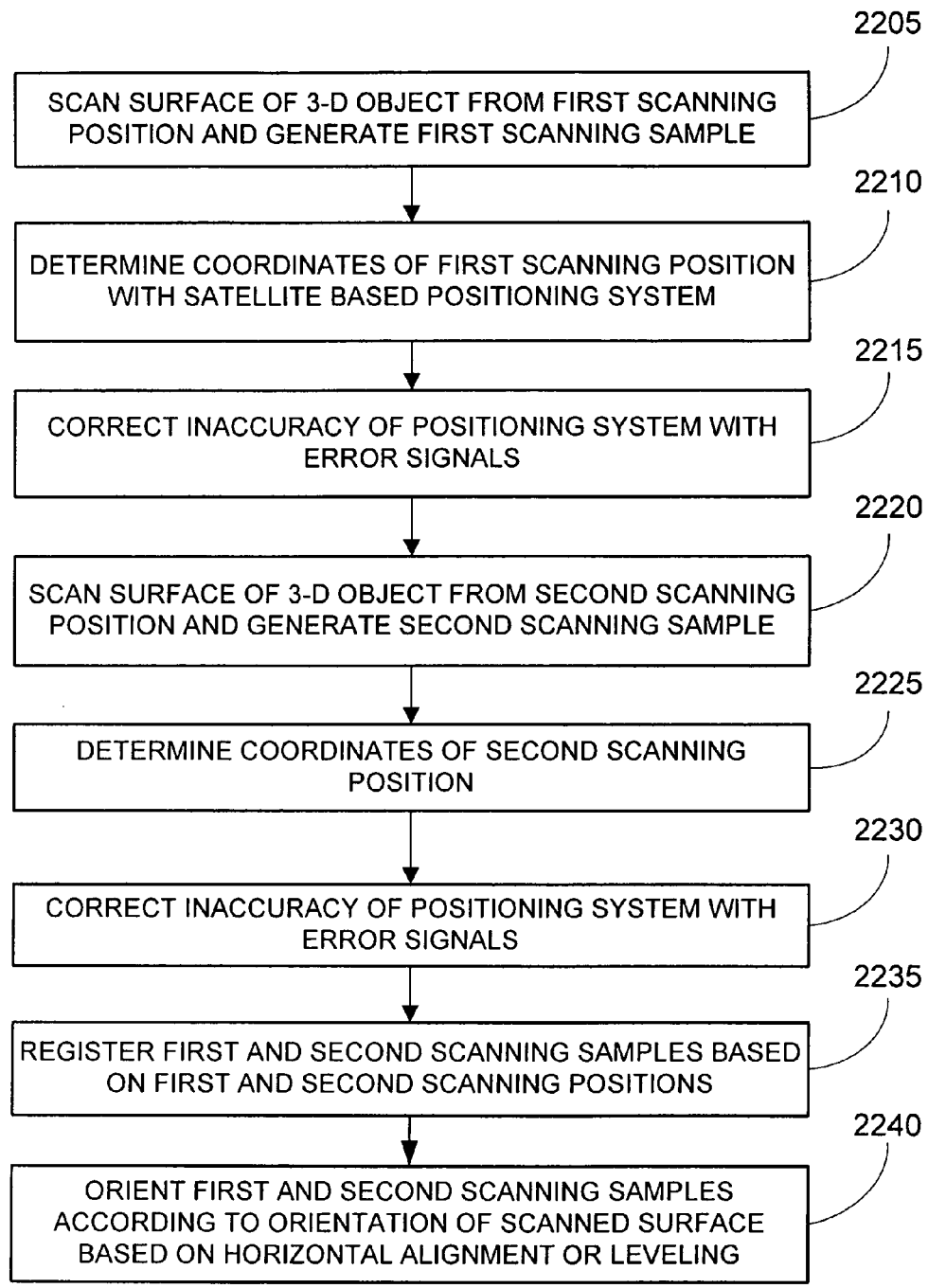
FIG. 22 is a flowchart of a scanning method of a three-dimensional object.

FIG. 22 is a flowchart of a scanning method of a three-dimensional object. A surface of the three-dimensional object may be scanned from a first scanning position (act 2205). As a result of the scan, a first scanning sample is generated (act 2205). The first scanning sample may comprise a point cloud that includes data points representing corresponding positions on the surface of the three-dimensional object. The data points may represent coordinates that may be coordinates of a local coordinate system of a scanning system.

Coordinates of the first scanning position are determined at act 2210. The determination may use a satellite based positioning system. The coordinates determined through the satellite based positioning system may be absolute or relative coordinates in an arbitrary coordinate system such as world coordinates. World coordinates may provide a user with geographic longitude and latitude of the scanning positions. The satellite based positioning system may comprise a Differential Global Positioning System (DGPS). A Navstar Global Positioning System (GPS) may also be used but may be subject to distortion effects and delays due to atmospheric turbulences.

Some or all of the error in positioning may be corrected through an error signal (act 2215). Because satellite based positioning system may include a deviation, a signal error may be used to compensate for inaccurate locations. In particular, correction data may be processed with the radio transmitted location information. In this method no employment of passing points may be necessary and scanning results may be readily checked on-site. The scanning results may also be supplemented by other scanning samples.

When GPS signals are received at recognizable positions, errors in the GPS signals may be easily detected and used to generate the correction signal. The correction signal may be sourced other systems as well. DGPS systems may be based on the correction signal. The German National Survey Satellite Positioning Service (SAPOS) provides position information on accuracy of these systems within several centimeters. SAPOS use permanently operating reference stations of Global Navigation Satellite Systems to provide correction data for real-time GPS data.

Correction data for real-time GPS data may be limited by its public course acquisition code and the original observation data for GPS post-processing. In some systems, the SAPOS HEPS may represent service that transmits correction data via VHF transmitters. Real-time position may be received at an accuracy level of about several centimeters. This service may be available via Global System for Mobile Communication.

A planned European DGPS known as EUROPOS may also be used. The three-dimensional scanning aided by DGPS may be carried out with accuracy level of several centimeters both in horizontal and vertical directions. Even extended structures such as big cities may be mapped and modeled in a three-dimensional way with improved precision.

The surface of the three-dimensional object may be further scanned from a second scanning position (act 2220). The scanned surface at the second scanning position may be different from the scanned surface at the first scanning position. The second scanning position may be different from the first scanning position. The first scanning position may be performed in front of the scanned object, whereas the second scanning position may be performed behind the scanned object. The distance between the scanning system and the scanned object at the first scanning position may be closer or farther than the distance at the second scanning position. Although the first scanning position and the second scanning position may be substantially different, al least one orientation of the scanning system with respect to the scanned object may be identical at the first and second scanning positions.

The scanning system may be configured to have a reduced degree of freedom. The scanning system may be horizontally aligned at the first and second scanning positions. The scanning system may be rotated between about 0° and about 360°. The horizontal alignment or leveling may allow one degree of freedom or a variable rotation. For the horizontal alignment or leveling, an operator of the scanning system may place the scanning system on a substantially flat or substantially horizontal surface. By maintaining this alignment or level the registration of the scan may be simplified.

A second scanning sample may be generated as a result of scan at the second scanning position (act 2220). Like the first scanning sample, the second scanning sample may include a point cloud comprising data points. Coordinates of the second scanning position may be determined with the satellite based positioning system (act 2225). Deviations or errors in the positioning system may be corrected through a second error signal (act 2230).

The first scanning sample and the second scanning sample may be registered based on the first scanning position and the second scanning position (act 2235). At these act the process joins the individual scans to form a three-dimensional electronic model. The registration may be performed automatically or manually on site, and may be referred to as "preliminary registration" or "provisional registration."

Registration (act 2235) may involve little or no preliminary registration or provisional registration. The registration (act 2235) may represent orientation of several scanning samples according to a spatial arrangement of different scanned parts of the three-dimensional object. The registering may be simplified due to the common horizontal alignment or leveling that occurs throughout the scanning process.

In FIG. 22, the first scanning position may be a reference point of the point cloud of the first scanning sample. The second scanning positioning also may be a reference point of the point cloud of the second scanning sample. A common selection may simplify the registering process. The registering may include translational and/or rotational operations applied to the first and second point clouds. The translational and/or rotational operations applied to the first and the second point clouds may be performed with respect to the reference point of the point clouds of the first scanning sample and the second scanning sample.

The geographical coordinates of the scanning system may be determined by the DGPS. The scanning system may be horizontally adjusted through a leveling or an alignment sensor. When the scanning system 100 remains horizontally aligned or leveled for several scans, the registering may be performed with appropriate rotations of the scanning samples only. The first and second scanning samples may be oriented with respect to each other according to orientation of the scanned surface of the three-dimensional object at the first scanning position and the second scanning position (act 2240).

Other scans from different scanning positions may also be performed. During the scanning process, coherent light or a scan beam may be transmitted to the surface of the three-dimensional object. Time delays between the emission of the light and its detected reflections at the first and second scanning positions may be measured. Additionally, angular orientation of the scanning beams at the first scanning position and the second scanning position may be measured.

The scanning direction at each scanning position may be measured with a compass or a device that determines geographic direction. The determination of the scanning directions with respect to the magnetic north pole may facilitate and shorten the registering process. As noted above, the scanning system may be horizontally aligned through multiple scans. With the determination of the scanning directions for each scan, multiple scanned data may be matched to form the image of the three-dimensional object. This registering may be performed through a computer or controller that processes fewer variables than scans that do not share a common alignment with one or more planes.

Figure 23:
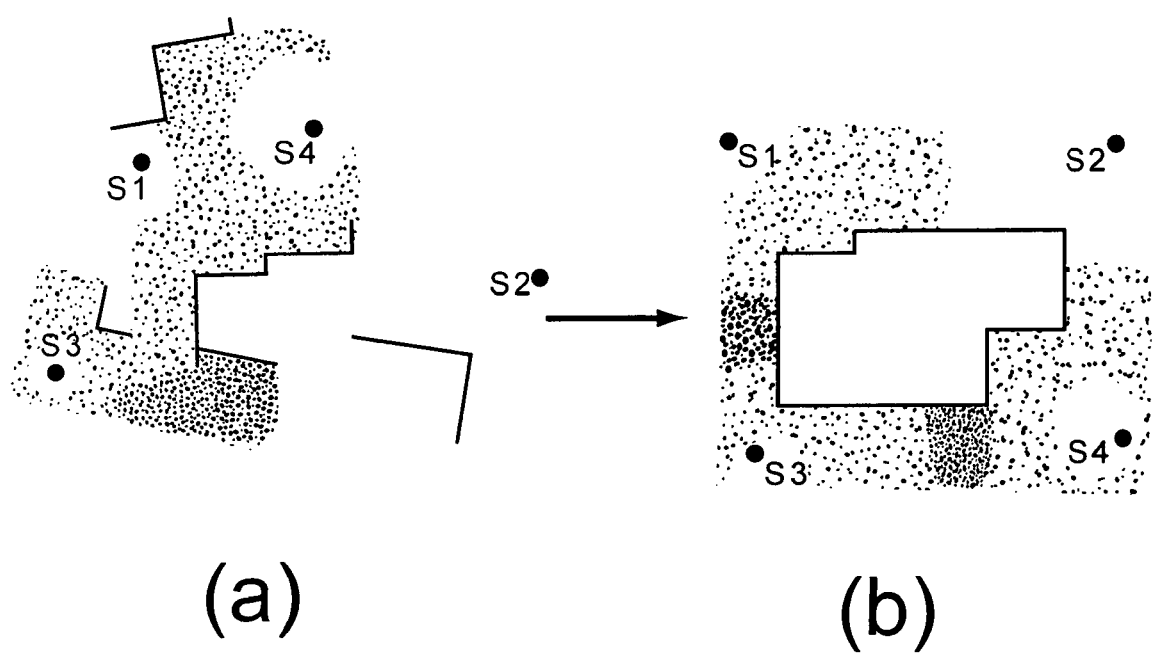
FIG. 23 shows an object registration.

The registration method may improve the accuracy of a scanned object. The modeled three-dimensional structure may be further processed for imaging with various software applications, as described in FIGS. 10-21. Realistic or nearly realistic three-dimensional models may be generated FIG. 23 shows an object registration. Panel (a) comprises two-dimensional cuts of four individual samples of scan data. These scan data may be obtained from different terrestrial scanning positions s1, s2, s3 and s4. Density and distribution of data points may depend on pre-determined parameters such as sampling rate, scan angle, scan frequency, etc. In FIG. 23, the scanned partial contours of a scanned object may be mismatched as shown in panel (a). Coarse preliminary registration may be performed on-site by measuring respective scanning directions at the different scanning positions s1-s4. The scanning direction may be measured with a device such as a compass.

Panel (b) of FIG. 23 illustrates the contours of the scanned building after proper registration. The contours of the scanned building may be easily identified in panel (b). The proper registration may rely on precise information on positions at which a respective scanning is carried out. In panel (b), scanning directions of the scanning positions s1-s4 may be determined. When scanning at positions s1-s4, a scanning system may be horizontally aligned or leveled and such alignment or leveling may remain unchanged for multiple scans at s1-s4. According to the scanning directions, the scanned data may be rotated to match such that the image of the building is formed as shown in panel (b).

Geographical coordinates of the scanning system may be determined with a Differential Global Positioning System (DGPS) device. For instance, the scanning system may include a laser scanner and the DGPS device may include a DGPS receiver. Position of the scanning system may represent a reference point of the scan data that may be represented as a point cloud. The DGPS receiver may measure ranges values as well as reflectance values such that both values may correspond to a single point in data space. The obtained point clouds may need to be reduced such that a model of scanned three-dimensional objects may be obtained. Various commercial software applications based on reflectance values may be used to reduce the point clouds, including Computer-Aided Design (CAD) applications.

Computer executable instructions for scanning the surface of the three-dimensional object may be recorded on a computer readable medium. A computer program product may include the computer readable medium. In the computer program product, means for scanning the surface of the three-dimensional object from the first and second scanning positions, means for generating the first and second scanning samples, means for determining coordinates of the samples, and means for registering of the scanning samples may be implemented as computer-executable instructions.

Figure 24:
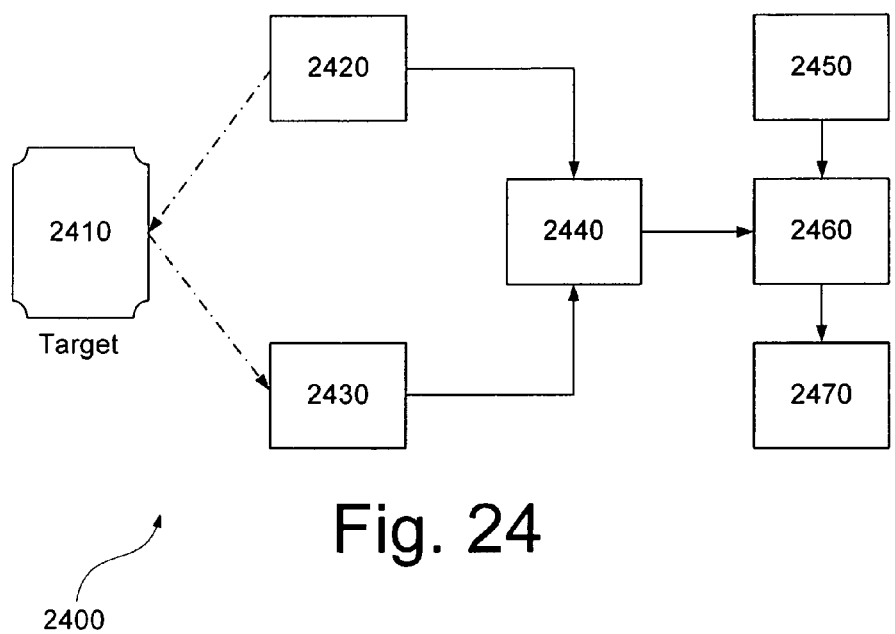
FIG. 24 is a block diagram of a scanning system of a three-dimensional object.

FIG. 24 illustrates a system 2400 for scanning topographical objects. The system 2400 may includes a target 2410, a laser 2420, a photodiode receiver 2430 and a time measuring unit 2440. The system 2400 also may include a DGPS receiver 2450, a central processing unit (CPU) 2460 and a point clouds generator 2470. The target 2410 may be illuminated with the semiconductor laser 2420. With a rotating mirror, the semiconductor laser 2420 may be scanning the target 2410 row by row with an angular resolution, for example, of about 0.02°.

A radio beam, a microwave beam, an infrared beam, coherent light, an ultrasound beam or other electromagnetic radiation may be used to perform the scanning. Alternatively, or additionally, a last pulse scanning means, a time-of-flight laser scanner and a phase-shift laser scanner may be used for the scanning. A last pulse scanning method may use a reflection signal that comes from the last point to obtain the scanning data. The emitted scanning beam may encounter the last point. The range measurement may be performed either by the "time of flight," or "phase difference" method.

The time of flight method may be a practical principle of measuring distances using, e.g., a short wave laser beam emitted from a semiconductor laser. A pulsed laser beam may be emitted and at the moment of emission, a time counter may start. The emitted beam hits the surface of a target and is partially reflected to a detector. At the moment of the detection, the time counter may stop. The time for passing the doubled distance between the sensor and the target may be measured. The real distance may be calculated by a microcomputer inside the scanner using the speed of light. A last pulse measuring technique may guarantee that the desired echo from the last target of a particular beam may be detected.

According to a phase difference method, a distance between the scanning system and the target may be determined from a shift of the phase of a continuous sinusoidal laser signal. The reflection of the beam on the surface of the target may result in the shift of the phase. The distance between the target and the sensor may be directly proportional to this shift.

The photodiode receiver 2430 may detect the reflected beam from the target 2410. In addition to direction and range information, the intensity of the reflected signal may be sensed. The intensity value may be saved as binary information e.g., an 8 bit word and points constituting the point clouds are processed by the CPU 2460. The points may be displayed in gray scales.

The time measuring unit 2440 may measure the time-of-flight and provide the CPU 2460 with the measured data. As described above, the time-of-flight may correspond to time interval between transmitted signals and received signals. In FIG. 24, the time measuring unit 2440 may receive the transmitted signals from the semiconductor laser 2420. The time measuring unit 2440 also may receive the received signals from the photodiode receiver 2430. Accordingly, the time measuring unit 2440 may measure the time interval. The time-of-flight may correspond to the doubled time interval between the scanning system 2400 and the target 2410 because the scanning beam hits the target 2410 and returns to the scanning system 2400.

The CPU 2460 may calculate the range to the scanned object. To generate a three-dimensional model of the target 2410, the target 2410 may need to be scanned from different scanning positions. The DGPS receiver 2450 may provide the CPU 2460 with positions of scanning system 2400 during the respective scanning processes. The CPU 2460 may calculate the point clouds 2470 that result from multiple individual beam reflections during a single scanning process and store the results as a scanning sample. Several scanning samples may be obtained from several scanning processes. The resulting set of the point clouds may need registration. Based on highly accurate position information, the CPU 2460 may efficiently assist an operator in the registration 2470 of the point clouds of the different scanning samples.

Figure 25:
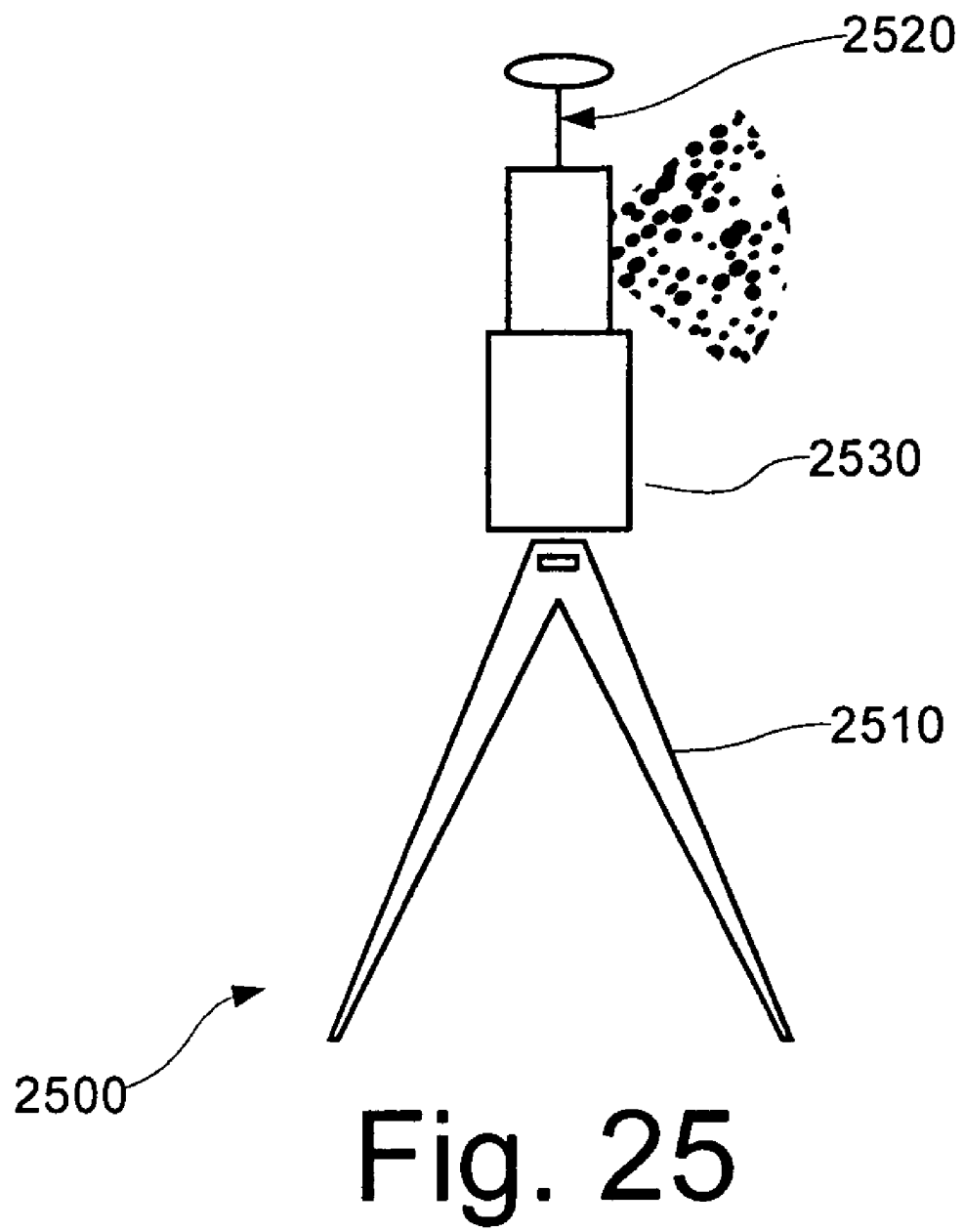
FIG. 25 is a-dimensional scanning system having a Differential Global Positioning System receiver.

FIG. 25 illustrates a three-dimensional scanning system 2500 having a DGPS receiver. The scanning system 2500 may be placed on a tripod 2510 for convenience. The tripod 2510 may facilitate horizontal alignment or leveling of the scanning system 2500. The scanning system 2500 may include a pulsed laser, a receiver, a time measuring unit, etc. The scanning system 2500 also may include a three-dimensional laser scanner 2530. The receiver may be a photodiode receiver, as described in connection with FIG. 24. The time measuring unit may determine the time interval between transmitted signals and received signals at the scanning system 2500. The time interval between the transmitted signals and the received signals may correspond to time of flight. The scanning system 2500 also may include a computing unit for signal processing. The measured time interval may be converted to a distance between the scanning system 2500 and a target with the following Equation (2):

$$\text{Distance} = \frac{\text{Speed of light} \times \text{Time of Flight}}{2} \quad \text{(Equation 2)}$$

The illustrated scanning system 2500 may be built into a theodolite. The theodolite is an optical instrument that has a small mounted telescope rotatable in horizontal and vertical planes. The theodolite may be used to measure angles in surveying. The theodolite may provide accurate horizontal and vertical angles offsets with respect to the point currently illuminated by the laser. Range and angle data may be recorded automatically, or immediately transformed to Cartesian coordinates relative to the instrument axis.

Prior to the scanning, the scanner 2530 may be horizontally adjusted with a DGPS sensor 2520. The horizontal scanning position may remain unchanged during different scanning operations at different places. It may be sufficient to calculate the proper registration by determining each rotation angle for different samples of scan data obtained at the respective positions. These positions may be obtained with high precision by using DGPS.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for scanning a three-dimensional object, comprising:
    scanning a first surface of a three-dimensional object from a first scanning position with a scanner;
    scanning at least a second surface of the three-dimensional object from a second scanning position with the scanner;
    generating a first scanning sample including a first point cloud and a second scanning sample including a second point cloud where the first point cloud has data points that represent positions corresponding to the first scanned surface at the first scanning position, and the second point cloud has data points that represent positions corresponding to the second scanned surface at the second scanning position;

determining coordinates of a geographic position of the scanner at the first scanning position and the second scanning position with a Differential Global Positioning System;

receiving a radio transmitted error signal;

correcting inaccuracies of the determined coordinates of the geographic position of the scanner based on the radio transmitted error signal;

where the first scanning position is a reference point of the first point cloud of the first scanning sample and the second scanning position is a reference point of the second point cloud of the second scanning sample; and registering the first scanning sample and the second scanning sample based on the first scanning position and the second scanning position, where the first scanning sample and the second scanning sample are oriented with respect to each other according to orientation of the first scanned surface with respect to the second scanned surface by applying to the first point cloud and the second point cloud at least one of translational and rotational operations, where the at least one of translational and rotational operations is performed on the first point cloud with respect to the reference point of the first point cloud and on the second point cloud with respect to the reference point of the second point cloud.

2. The method of claim 1, further comprising aligning the scanner in the first scanning position and the second scanning position in a substantially similar particular orientation during the scanning and storing the particular orientation from each of the first scanning position and the second scanning position.

3. The method of claim 2, where the aligning comprises horizontally aligning the scanner in the first scanning position and the second scanning position during the scanning and storing the respective horizontal alignment.

4. The method of claim 3, further comprising measuring and storing a facing direction of the scanner at each of the first and the second scanning positions.

5. The method of claim 4, where the registering comprises rotating the first scanning sample and the second scanning sample based on the stored facing direction of the scanner at each of the first and the second scanning positions.

6. The method of claim 1, where the scanning comprises scanning the first and second surface of the three-dimensional object with a laser beam, a radio beam, a microwave beam, an infrared beam or an ultrasonic beam.

7. The method of claim 1, where the scanning comprises scanning the first and second surface of the three-dimensional object with a laser pulse scanner.

8. The method of claim 1, where the scanning comprises scanning the first and second surface of the three-dimensional object with one of a time-of-flight laser scanner and a phase-shift laser scanner.

9. A scanning system, comprising:

a scanner that moves a scanning beam across a surface of a three-dimensional object, the scanner having a reduced degree of freedom to align the scanner in a horizontal direction with respect to the three-dimensional object;

a detector that detects a reflected scanning beam;

a receiver for use with a Differential Global Positioning System that determines a position of the scanner and corrects for inaccuracies of the determined position with an error signal transmitted to the scanning system, the error signal comprising position correction data; and a processing unit configured to format a plurality of scanning samples, each of the scanning samples comprising a point cloud representative of a scanned surface of the three-dimensional object in one of multiple geographic positions around the three-dimensional object, a first one of the scanning samples comprising a first point cloud obtained during a first scan at a first geographic position that is a reference point of the first point cloud, and a second one of the scanning samples comprising a second point cloud obtained during a second scan at a second geographic position that is a reference point of the second point cloud; and the processing unit further configured to perform at least one of translational and rotational operations on the first point cloud with respect to the reference point of the first point cloud and on the second point cloud with respect to the reference point of the second point cloud to orient the first scanning sample and the second scanning sample with respect to each other.

10. The scanning system of claim 9, where the scanner is aligned in a particular orientation for multiple scans of the three-dimensional object in multiple geographic positions around the three-dimensional object.

11. The scanning system of claim 9, where the scanner is configured to be horizontally aligned substantially similarly at multiple scanning positions in multiple geographic positions around the three-dimensional object.

12. The scanning system of claim 9, further comprising a sensor that detects horizontal alignment, and the scanner is configured with a horizontal adjustment so that the scanner can be configured to maintain the horizontal alignment detected with the sensor as substantially unchanged for multiple scans of the three-dimensional object in multiple geographic positions around the three-dimensional object.

13. The scanning system of claim 9, further comprising a data generator that generates the first and second point clouds corresponding to the scanned surface of the three-dimensional object.

14. The scanning system of claim 9, further comprising a storage unit for storing the plurality of scanning samples.

15. The scanning system of claim 9, further comprising a register that registers different point clouds contained in different scanning samples based on a position of the scanner in multiple geographic positions around the three-dimensional object.

16. The scanning system of claim 9, where the scanning beam comprises one of a laser beam, a radio beam, a microwave beam, an infrared beam and an ultrasonic beam.

17. The scanning system of claim 9, further comprising a scanning beam emitter configured to emit a pulsed scanning beam.

18. The scanning system of claim 9, further comprising a scanning beam emitter configured to emit a laser beam as a scanning beam.

19. The scanning system of claim 9, where the detector is configured to detect a last pulse reflection of the scanning beam.

20. The scanning system of claim 9, where the scanner is configured to operate as one of a time-of-flight laser scanner and a phase-shift laser scanner.

21. The scanning system of claim 9, where the detector comprises a photodiode receiver.

22. The scanning system of claim 9, further comprising a time measuring unit that determines a time interval between a transmitted signal and a received signal at the scanning system.

23. The scanning system of claim 9, further comprising a theodolite, where the scanner is configured to be coupled with the theodolite.

24. The scanning system of claim 9, where the scanner is horizontally adjustable based on the Differential Global Positioning System receiver so that a horizontal scanning position of the scanner remains substantially unchanged during a scanning operation at multiple geographic positions around the three-dimensional object.

25. The scanning system of claim 24, wherein the processing unit is further configured to determine each rotation angle for the scanning samples.

26. The scanning system of claim 25, where each rotation angle corresponds to one of multiple geographic positions of the scanner.

27. A computer readable medium having computer executable instructions stored thereon for scanning a three-dimensional object, the computer readable medium comprising:
  instructions to receive scan data from a scanner, the scan data representative of a first surface of a three-dimensional object and a second surface of a three-dimensional object, the scan data representative of the first surface collected with the scanner positioned adjacent the three-dimensional object in a first scanning position that is a reference point of the scan data representative of the first surface, and the scan data representative of the second surface collected with the scanner positioned adjacent the three-dimensional object in a second scanning position that is a reference point of the scan data representative of the second surface;
  instructions to generate a first scanning sample including a first point cloud and a second scanning sample including a second point cloud, the first point cloud comprising data points corresponding to the first surface, and the second point cloud comprising data points corresponding to the second surface;
  instructions to receive geographic coordinates of each of the first scanning position and the second scanning position from a Differential Global Positioning system;
  instructions to receive an error signal comprising position correction data;
  instructions to correct an error in the geographic coordinates of at least one of the first scanning position and the second scanning position based on the error signal; and
  instructions to manipulate and join the first scanning sample and the second scanning sample based on the geographic coordinates of the first scanning position and the second scanning position, where the first scanning sample and the second scanning sample are oriented during manipulation with respect to each other according to the reference point of the scan data representative of the first surface and the reference point of the scan data representative of the second surface.

28. The computer readable medium of claim 27 further comprising instructions to receive a horizontal scanning position of the scanner in each of the first scanning position and the second scanning position, and the instructions to manipulate and join the first scanning sample and the second scanning sample further comprise instructions to orient the first scanning sample and the second scanning sample during manipulation with respect to each other according to the reference point of the scan data representative of the first surface, the reference point of the scan data representative of the second surface and the horizontal scanning position.

29. The computer readable medium of claim 28 further comprising instructions to receive a signal representing a facing direction of the scanner for each of the first scanning position and the second scanning position, and the instructions to manipulate and join the first scanning sample and the second scanning sample further comprises instructions to orient the first scanning sample and the second scanning sample during manipulation with respect to each other according to the reference point of the scan data representative of the first surface, the reference point of the scan data representative of the second surface, the horizontal scanning position, and the facing direction.

30. The computer readable medium of claim 27 further comprising instructions to generate a mirror image of the first scanning sample when the first surface of the three-dimensional object is indicated as symmetrical to a third surface of the three-dimensional object.

* * * * *